United States Patent
Legg et al.

(10) Patent No.: US 11,382,028 B2
(45) Date of Patent: Jul. 5, 2022

(54) WIRELESS COMMUNICATION FOR VEHICLE BASED NODE

(71) Applicant: BluWireless Technology Limited, Bristol (GB)

(72) Inventors: Peter Jonathon Legg, Bristol (GB); James Simon Pascoe, Bristol (GB); Simon Davies, Bristol (GB)

(73) Assignee: BluWireless Technology Limited, Bristol (GB)

( * ) Notice: Subject to any disclaimer, the term of this patent is extended or adjusted under 35 U.S.C. 154(b) by 0 days.

(21) Appl. No.: 17/078,511

(22) Filed: Oct. 23, 2020

(65) Prior Publication Data
US 2022/0132401 A1    Apr. 28, 2022

(51) Int. Cl.
| | |
|---|---|
| H04W 48/16 | (2009.01) |
| H04W 72/04 | (2009.01) |
| H04W 88/06 | (2009.01) |
| H04B 7/08 | (2006.01) |
| H04W 88/08 | (2009.01) |

(52) U.S. Cl.
CPC .......... *H04W 48/16* (2013.01); *H04B 7/0897* (2013.01); *H04W 72/046* (2013.01); *H04W 88/08* (2013.01)

(58) Field of Classification Search
CPC ... H04W 48/16; H04W 72/046; H04W 88/08; H04B 7/0897
USPC .......................................................... 370/311
See application file for complete search history.

(56) References Cited

U.S. PATENT DOCUMENTS

2006/0234720 A1* 10/2006 Takizawa .............. H04W 36/22
455/453
2007/0184831 A1    8/2007 Morimoto
(Continued)

FOREIGN PATENT DOCUMENTS

| | | |
|---|---|---|
| CN | 107211348 A | 9/2017 |
| EP | 1133208 A1 | 9/2001 |
| EP | 3668209 A1 | 6/2020 |

OTHER PUBLICATIONS

Kyocera, "Inter-operator LAA Cells Coordination using the LTE Beacon and the LTE Header Channels", R1-151055, 3GPP TSG RAN WG1 Ad-hoc Meeting Paris, France, Mar. 24-26, 2015.
(Continued)

*Primary Examiner* — Inder P Mehra
(74) *Attorney, Agent, or Firm* — Optimus Patents US, LLC

(57) ABSTRACT

A communication system comprises a fixed network comprising access points for mm wave radio communication using directional beams. A wireless modem of a vehicle comprises a first search circuit searching for a beacon transmission in a first frequency channel. A first data receiver extracts data from a detected beacon signal including: an indication of a first access point transmitting the beacon signal; a first load value indicative of a loading of the first access point; and an indication of a second access point having overlapping coverage with the first access point. Another receiver extracts data from a second beacon signal transmitted by the second access point in a second frequency channel including a second load value indicative of a loading of the second access point. A controller selects a target access point dependent on the first and second load values, and initializes a link setup with the target access point.

16 Claims, 14 Drawing Sheets

(56) References Cited

U.S. PATENT DOCUMENTS

| | | | | |
|---|---|---|---|---|
| 2009/0088605 | A1* | 4/2009 | Ross | G16H 40/67 |
| | | | | 600/300 |
| 2018/0249461 | A1* | 8/2018 | Miao | H04W 24/10 |
| 2019/0075469 | A1* | 3/2019 | Mahoney | H04W 16/12 |
| 2019/0364492 | A1* | 11/2019 | Azizi | H04W 48/16 |
| 2020/0336914 | A1* | 10/2020 | Kaushik | H04W 12/122 |
| 2021/0274325 | A1* | 9/2021 | Legg | H04W 72/1284 |

OTHER PUBLICATIONS

Noh Gosan et al: "mmWave-Based Mobil Backhaul Transceiver for High Speed Train Communication Systems", 2017 IEEE Globecom Workshops (GC WKSHPS), IEEE, Dec. 4, 2017 (Dec. 4, 2017), pp. 1-5, XP033307269, DOI: 10.1109/GLOCOMW.2017.8269215 [retrieved on Jan. 24, 2018] * sections II and III *.
EPO Article 94(3) Communication; Application Serial No. 21 202 774.2-1212, filed by Blu Wireless Technology Ltd dated Mar. 16, 2022, pp. 1-10.

* cited by examiner

WIRELESS COMMUNICATION FOR VEHICLE BASED NODE

FIELD OF THE INVENTION

The invention relates to support of communication with a vehicle based node, and in particular, but not exclusively, to wireless communication for a node on a train.

BACKGROUND OF THE INVENTION

Wireless communication has become ubiquitous and forms the basis of many applications and services provided to the consumer of today. A particularly widespread set of wireless communication systems, colloquially known as Wi-Fi, has been developed by the Wi-Fi Alliance and is standardized in the Institute of Electrical and Electronics Engineers' (IEEE) 802.11 standards. Wi-Fi wireless communication systems are typically used to implement Wireless Local Area Networks (WLANs) in many different environments, such as in homes, workplaces, or public areas.

Wi-Fi systems provide many functions, features and services suitable for efficient implementation of WLANs and data communication. The IEEE 802.11 standards have been, and are being, developed to provide an increasing number of functions, services and benefits. The initial versions of the IEEE 802.11 standards were based on radio communication in the 2.4 GHz band, but this has been enhanced to also include the 5 GHz band. One variant is known as IEEE 802.11ad and this further expands the standard to support communications in the 60 GHz band.

A particularly difficult challenge for a communication infrastructure is to support mobility. In particular, it is difficult to provide high data rate support for fast moving vehicles, for example in order to support high capacity Internet access on board trains.

Conventional Wi-Fi systems allow handovers between different access points and accordingly provide some mobility support. However, the handovers and general mobility support tend to be relatively slow (with an interruption in data connectivity) and relatively complex and tend to not be suitable for faster moving mobile stations, such as fast-moving vehicles. Traditional Wi-Fi access points also tend to be limited to a relatively low capacity/throughput.

Another approach is to use cellular communication systems that are inherently developed to support mobility. However, such systems tend to have large cells and to be restricted to much lower capacity and throughput speed than desired.

A general problem is that in order to support high capacity communication with, in particular, a fast moving vehicle, a significant amount of air interface resource (spectrum) is required, and this tends to restrict the capacity that can be provided by many existing systems in the most frequently used frequency ranges. This in particular applies to both cellular and Wi-Fi based wireless communication systems. It is therefore desirable to exploit less used frequency bands and there is substantial interest in providing high capacity support of fast moving vehicles using millimeter-wave (mm) wavelength based communication, such as specifically the 60 GHz frequency band. However, the mobility challenges known from e.g. Wi-Fi systems become even more significant. For example, for 60 GHz communications, the radio communication link is directional and heavily dependent on the specific current conditions, such as distance, line of sight, etc. For a fast moving vehicle this results in an increased number of handovers and in continuously fast changing conditions. Whilst some direction changes can be accommodated by steering the antennae of the radio communication link, there is not the omnidirectional capability of typical cellular and Wi-Fi radios.

In general, the efficient usage of the air interface in mm wave communication and with potentially fast-moving vehicles is a difficult challenge to address. This challenge is further exacerbated by the desire to provide this function in communication systems that are compatible with many existing network techniques and principles, such as Internet Protocol based routing, existing network-based mobility functions etc. However, most approaches for supporting communication for in particular fast moving vehicles tend to be suboptimal.

In particular, providing sufficient air interface capacity to support high rate communication with moving vehicles, such as for supporting Internet access to a high number of passengers on a train, is a difficult challenge. It is in particular difficult for mm wave communication systems as the particular propagation properties thereof tend to make it inefficient to merely reduce cell sizes and increase the number of access points. It is further difficult to achieve for systems where the vehicle based communications have limited functionality and therefore limited information. For example, such communication functions may not be able to continuously and simultaneously detect, measure, and evaluate all possible candidate access points.

Indeed, many approaches for such systems tend to result in significant hotspots, uneven load balancing, and a less than optimum practical usage of the potentially available air interface resource and capacity.

Further, efficient resource management and load balancing for the air interface tend to require complex and centralized resource management functions that are based on information provided for several access points. This tends to increase complexity and overheads (e.g. due to signaling) and is not optimal for systems that seek to provide more control to remote stations. It also tends to be less suitable for updating and introduction of the new functions and operations to existing systems.

Hence, an improved approach for supporting communication with moving vehicles via mm wave radio communication links would be advantageous. In particular, an approach that allows improved operation, improved reliability, increased flexibility, facilitated implementation, facilitated operation, improved resource utilization and in particular air interface resource utilization, reduced signaling, facilitated and/or improved resource management and/or load balancing, improved handover performance, increased over the air communication capacity, reduced functionality requirements, improved performance, and/or improved support for communication with vehicles would be advantageous.

SUMMARY OF THE INVENTION

Accordingly, the Invention seeks to preferably mitigate, alleviate or eliminate one or more of the above-mentioned disadvantages singly or in any combination.

According to an aspect of the invention, there is provided a communication system for supporting communication between an end node of a vehicle and a remote correspondent node via a fixed network, the communication system comprising: a plurality of wireless access points of the fixed network, each wireless access point having a directional antenna arrangement for mm wave radio communication using directional beams, each of the plurality of wireless access points being arranged to transmit a beacon signal in a mm wave frequency channel allocated to the wireless access point; at least a first wireless modem arranged to establish mm wave radio communication links to wireless access points of the plurality of wireless access points, the mm wave radio communication links supporting a data session between the end node and the remote correspondent node, the first wireless modem being located on the vehicle and employing electronically steerable beamforming directional antennas for establishing the mm wave radio communication links, wherein the first wireless modem comprises: a first search circuit arranged to search for a beacon transmission in a first frequency channel; a first data receiver arranged to extract data from a detected beacon signal, the first data receiver being arranged to extract from the detected beacon signal: an indication of a first wireless access point of the plurality of wireless access points transmitting the beacon signal; a first load value indicative of a loading of the first wireless access point; an indication of a second wireless access point having overlapping coverage with the first wireless access point; a second data receiver arranged to extract data from a second beacon signal transmitted by the second wireless access point in a second frequency channel being different from the first frequency channel; the second data receiver being arranged to determine the second beacon signal in response to the indication of the second wireless access point and to extract from the second beacon signal a second load value indicative of a loading of the second wireless access point; a selection circuit arranged to select a target wireless access point from a set of wireless access points of the plurality of wireless access points dependent on the first load value and the second load value, the set of wireless access points comprising the first wireless access point and the second wireless access point; and a circuit arranged to initialize a mm wave link setup with the target wireless access point.

The invention may provide improved and/or facilitated operation and/or improved performance for a beamform based mm wave radio communication system supporting (potentially fast) moving vehicles. The approach may, in particular, provide efficient and reliable communication and may in many embodiments provide improved capacity of the available air interface resource supporting communication for a vehicle. The approach may in many embodiments provide improved consistency and reduced data interruption and/or performance degradation.

The approach may in particular provide increased capacity for the air interface and may specifically be suitable for providing increased capacity for hot spots. The approach may allow efficient and/or improved load balancing in many embodiments. Further, in many embodiments, the approach may allow efficient operation without requiring high complexity of operation or functionality. The approach may in particular provide advantageous performance by allowing wireless modems to only be able to search for a beacon signal in a single channel for extended periods of time.

The approach may allow load balancing and resource management to be performed based on wireless modem operations and functionality and with reduced requirements for functionality in the access points or fixed network. In particular, efficient resource management, such as improved load balancing, may typically be achieved without a complex resource management function being implemented in the fixed network or access system (including access points).

The approach may provide a more flexible approach in many scenarios. It may in many systems allow facilitated introduction of new functionality or additional air interface capacity. It may for example facilitate introduction of an additional access point to provide increased air interface capacity for a hot spot area.

The use of beams from directional antennas may specifically support radio communication links from different wireless modems of the vehicle to the same access point or to different access points. It may allow steering of the beams towards the same or different access points thereby enabling or improving multiple links between the vehicle and access points. This may provide improved performance.

The wireless modems, controller, and/or end node may be in/on/attached to/move with etc. the vehicle, and may be part of a mobile network that moves with the vehicle.

The detected beacon signal may be a beacon signal detected by the first search circuit in the first frequency channel. The detected beacon signal may be a beacon signal transmitted by the first wireless access point.

In accordance with an optional feature of the invention, the first load value is indicative of a first number of wireless modems having mm wave links established with the first wireless access point.

In accordance with an optional feature of the invention, the second load value is indicative of a second number of wireless modems having mm wave links established with the second wireless access point.

In accordance with an optional feature of the invention, the controller is arranged to select the first wireless access point as the target wireless access point if a difference between the second number and the first number exceeds a threshold and to select the second wireless access point as the target wireless access point if the difference between the second number and the first number is below the threshold.

The difference may be indicative of the second number subtracted from the first number (and may e.g. directly be the second number subtracted from the first number). The threshold may be zero.

In accordance with an optional feature of the invention, the controller is arranged to select the first wireless access point as the target wireless access point if an absolute difference between the first load value and the second load value is below a threshold.

In accordance with an optional feature of the invention, the first load value is indicative of a number of vehicles having mm wave links established with the first wireless access point.

In accordance with an optional feature of the invention, the first wireless access point is arranged to include no load data for the second wireless access point in a beacon signal transmitted by the first wireless access point.

In accordance with an optional feature of the invention, the second wireless access point is arranged to include no load data for the first wireless access point in a beacon signal transmitted by the second wireless access point.

In accordance with an optional feature of the invention, the second wireless access point is arranged to transmit load data to the first wireless access point and the first wireless access point is arranged to transmit the indication of the second wireless access point conditional on a loading of the second wireless access point indicated by the load data meeting a criterion.

In some embodiments, the criterion includes a consideration of a loading of the first wireless access point.

In accordance with an optional feature of the invention, the criterion is dependent on a loading of the first wireless access point.

In accordance with an optional feature of the invention, the criterion includes a requirement that the loading of the first wireless access point exceeds the loading of the second wireless access point by more than a threshold.

In accordance with an optional feature of the invention, the first wireless access point and the second wireless access point are co-located.

In accordance with an optional feature of the invention, the first wireless access point and the second wireless access point is no more than 100 m.

In accordance with an optional feature of the invention, the first wireless access point is arranged to transmit the indication of the second wireless access point conditional on a loading of the first wireless access point meeting a criterion.

In accordance with an optional feature of the invention, the second data receiver is arranged to determine the second frequency channel in response to an indication of the second frequency channel extracted from the first beacon signal According to an aspect of the invention there is provided a wireless modem for a communication system supporting communication between an end node of a vehicle and a remote correspondent node via a fixed network, the communication system comprising: a plurality of wireless access points of the fixed network, each wireless access point having a directional antenna arrangement for mm wave radio communication using directional beams, each of the plurality of wireless access points being arranged to transmit a beacon signal in a mm wave frequency channel allocated to the wireless access point; wherein the wireless modem is arranged to establish mm wave radio communication links to wireless access points of the plurality of wireless access points, the mm wave radio communication links supporting a data session between the end node and the remote correspondent node, the wireless modem being located on the vehicle and employing electronically steerable beamforming directional antennas for establishing the mm wave radio communication links, the wireless modem further comprising: a first search circuit arranged to search for a beacon transmission in a first frequency channel; a first data receiver arranged to extract data from a detected beacon signal, the first data receiver being arranged to extract from the detected beacon signal: an indication of a first wireless access point of the plurality of wireless access points transmitting the beacon signal; a first load value indicative of a loading of the first wireless access point; an indication of a second wireless access point having overlapping coverage with the first wireless access point; a second data receiver arranged to extract data from a second beacon signal transmitted by the second wireless access point in a second frequency channel being different from the first frequency channel; the second data receiver being arranged to determine the second beacon signal in response to the indication of the second wireless access point and to extract from the second beacon signal a second load value indicative of a loading of the second wireless access point; a selection circuit arranged to select a target wireless access point from a set of wireless access points of the plurality of wireless access points dependent on the first load value and the second load value, the set of wireless access points comprising the first wireless access point and the second wireless access point; and a circuit arranged to initialize a mm wave link setup with the target wireless access point.

According to an aspect of the invention there is provided a method of operation for a communication system supporting communication between an end node of a vehicle and a remote correspondent node via a fixed network, the communication system comprising: a plurality of wireless access points of the fixed network, each wireless access point having a directional antenna arrangement for mm wave radio communication using directional beams, each of the plurality of wireless access points being arranged to transmit a beacon signal in a mm wave frequency channel allocated to the wireless access point; at least a first wireless modem arranged to establish mm wave radio communication links to wireless access points of the plurality of wireless access points, the mm wave radio communication links supporting a data session between the end node and the remote correspondent node, the first wireless modem being located on the vehicle and employing electronically steerable beamforming directional antennas for establishing the mm wave radio communication links, and wherein the method comprises the first wireless modem: searching for a beacon transmission in a first frequency channel; extracting data from a detected beacon signal, the first data receiver being arranged to extract from the detected beacon signal: an indication of a first wireless access point of the plurality of wireless access points transmitting the beacon signal; a first load value indicative of a loading of the first wireless access point; an indication of a second wireless access point having overlapping coverage with the first wireless access point; extracting data from a second beacon signal transmitted by the second wireless access point in a second frequency channel being different from the first frequency channel, the extracting data including determining the second beacon signal in response to the indication of the second wireless access point and extracting from the second beacon signal a second load value indicative of a loading of the second wireless access point; selecting a target wireless access point from a set of wireless access points of the plurality of wireless access points dependent on the first load value and the second load value, the set of wireless access points comprising the first wireless access point and the second wireless access point; and initializing a mm wave link setup with the target wireless access point According to an aspect of the invention there is provided a method of operation for a communication system supporting communication between an end node of a vehicle and a remote correspondent node via a fixed network, the communication system comprising: a plurality of wireless access points of the fixed network, each wireless access point having a directional antenna arrangement for mm wave radio communication using directional beams, each of the plurality of wireless access points being arranged to transmit a beacon signal in a mm wave frequency channel allocated to the wireless access point; at least a first wireless modem arranged to establish mm wave radio communication links to wireless access points of the plurality of wireless access points, the mm wave radio communication links supporting a data session between the end node and the remote correspondent node, the first wireless modem being located on the vehicle and employing electronically steerable beamforming directional antennas for establishing the mm wave radio communication links, and wherein the method comprises the first wireless modem: searching for a beacon transmission in a first frequency channel; extracting data from a detected beacon signal, the first data receiver being arranged to extract from the detected beacon signal: an indication of a first wireless access point of the plurality of wireless access points transmitting the beacon signal; a first load value indicative of a loading of the first wireless access point; an indication of a second wireless access point having overlapping coverage with the first wireless access point; extracting data from a second beacon signal transmitted by the second wireless access point in a second frequency channel being different from the first frequency channel, the extracting data including determining the second beacon signal in response to the indication of the second wireless access point and extracting from the second beacon signal a second load value indicative of a loading of the second wireless access point; selecting a target wireless access point from a set of wireless access points of the plurality of wireless access points dependent on the first load value and the second load value, the set of wireless access points comprising the first wireless access point and the second wireless access point; and initializing a mm wave link setup with the target wireless access point According to an aspect of the invention there is provided method of operation for a wireless modem of a communication system supporting communication between an end node of a vehicle and a remote correspondent node via a fixed network, the communication system comprising: a plurality of wireless access points of the fixed network, each wireless access point having a directional antenna arrangement for mm wave radio communication using directional beams, each of the plurality of wireless access points being arranged to transmit a beacon signal in a mm wave frequency channel allocated to the wireless access point; wherein the wireless modem is arranged to establish mm wave radio communication links to wireless access points of the plurality of wireless access points, the mm wave radio communication links supporting a data session between the end node and the remote correspondent node, the wireless modem being located on the vehicle and employing electronically steerable beamforming directional antennas for establishing the mm wave radio communication links, the method comprising: searching for a beacon transmission in a first frequency channel; extracting data from a detected beacon signal, the first data receiver being arranged to extract from the detected beacon signal: an indication of a first wireless access point of the plurality of wireless access points transmitting the beacon signal; a first load value indicative of a loading of the first wireless access point; an indication of a second wireless access point having overlapping coverage with the first wireless access point; extracting data from a second beacon signal transmitted by the second wireless access point in a second frequency channel being different from the first frequency channel, the extracting data including determining the second beacon signal in response to the indication of the second wireless access point and extracting from the second beacon signal a second load value indicative of a loading of the second wireless access point; selecting a target wireless access point from a set of wireless access points of the plurality of wireless access points dependent on the first load value and the second load value, the set of wireless access points comprising the first wireless access point and the second wireless access point; and initializing a mm wave link setup with the target wireless access point.

There may be provided an access point for a communication system for supporting communication between an end node of a vehicle and a remote correspondent node via a fixed network, the wireless access points being part of the fixed network and comprising: a directional antenna arrangement for mm wave radio communication using directional beams, the access point comprising: a beacon signal transmitter arranged to transmit a beacon signal in a first mm wave frequency channel, the beacon signal comprising: an indication of the wireless access point; a load value indicative of a loading of the wireless access point; an indication of a second wireless access point having overlapping coverage with the first wireless access point.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF SOME EMBODIMENTS OF THE INVENTION

Figure 1:
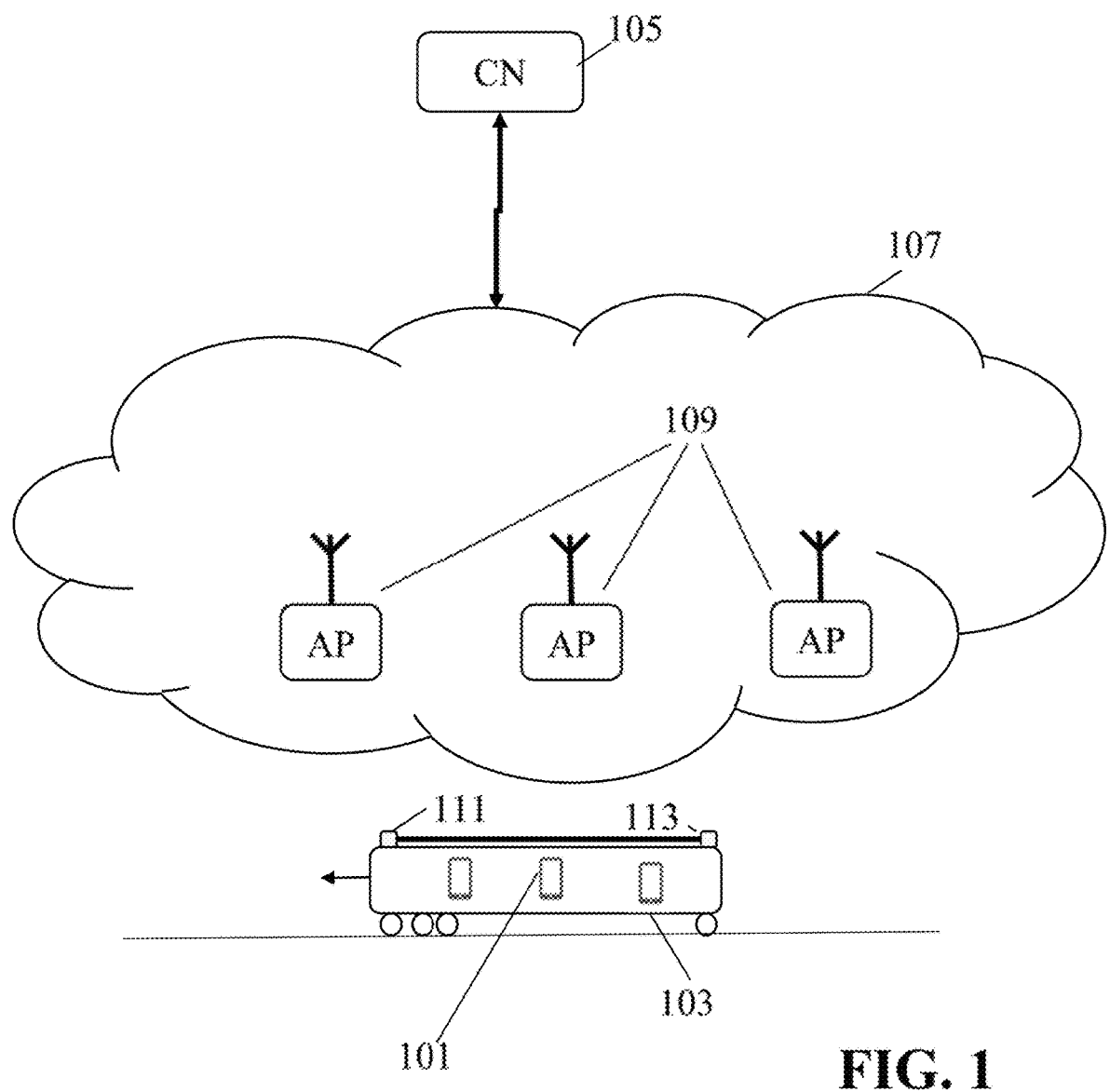
FIG. 1 illustrates an example of elements of a wireless communication system in accordance with some embodiments of the invention.

FIG. 1 illustrates an example of elements of a communication system which supports communication with end nodes that are located in moving vehicles, and in particular in fast moving vehicles such as cars, boats, buses, and trains. The following description will focus on an example in which the vehicle is a train, but it will be appreciated that in other embodiments the end node may be part of other vehicles, such as e.g. a bus driving on a motorway.

In the example of FIG. 1, a communication/data session is established between a correspondent node 105 and an end node 101 located in a train/vehicle 103. It will be appreciated that references to an entity being at/with/in/on etc. a vehicle includes any physical or logical form of the vehicle and entity being substantially co-moving, including the entity being positioned on, attached to, embedded within, etc. the vehicle. It will also be appreciated that it does not require the entity to be immovable with respect to the vehicle but rather it may include, for example, an entity being manually moved by a person (such as a person carrying a mobile device comprising the end node 101). An entity being in a vehicle may include all scenarios wherein the movement of the entity is at least partially dependent on the movement of the vehicle/where the movement of the vehicle imparts a movement on the entity.

The correspondent node 105 may be any communication node/service, and indeed may itself be a mobile node, or a node located in a vehicle. The following description will consider a scenario wherein the correspondent node 105 is a server supporting a corresponding client operating on the end node 101, and specifically a World Wide Web application will be considered where the correspondent node 105 is a web server supporting a web browser on the end node 101 accessing an Internet site supported by the web server of the corresponding node 105.

The communication/data session is supported by a fixed network 107 which may specifically be a complex network comprising routers, switches, management nodes, mobility controllers, modems etc. as will be known to the skilled person. In the example, the fixed network 107 is a Wide Area Network, WAN, based on the Internet Protocol (IP).

The correspondent node 105 is coupled to the fixed network 107 through a communication connection which supports the data session with the end node 101. The communication connection is in the example an IP connection and may be established using any suitable means, such as e.g. by a direct connection of a device comprising the corresponding node 105 to a node of the fixed network or e.g. it may be a connection which is provided by a network coupled to both the fixed network 107 and the corresponding node 105. The network may in particular be the Internet, and the coupling of the correspondent node 105 to the fixed network 107 may be via an Internet connection. It will also be appreciated that the fixed network 107 itself may be considered fully or partially part of the Internet and/or that the Internet may form part of the fixed network 107.

It will be appreciated that although FIG. 1 (and the following) figures focusses on description of communication for one end node, the system will typically support simultaneous communication for a large number of end nodes and in many embodiments, the combined data rate for communication to/from the vehicle may be in the order of several tens or even hundreds of Gigabit per second.

The coupling of the fixed network 107 to nodes on the train 103 is supported by wireless radio communication links. For this purpose, the fixed network 107 comprises a plurality of wireless access points (APs) 109 which in the specific example may be a relatively large number of stationary access points e.g. positioned along train tracks to support communication for a train.

Correspondingly, the train/vehicle 103 comprises a plurality of wireless modems 111, 113 which are arranged to establish wireless (radio) communication links with the access points 109. The wireless modems 111, 113 are further arranged to establish one or more connections with the end node 101. The wireless modems 111, 113 are accordingly located at (in/on etc.) the train and are arranged to communicate with the access points 109 in order to provide an interface between the vehicle network nodes and entities (and specifically the end node 101) and the fixed network 107.

In the specific embodiment, the wireless radio links between the wireless modems 111, 113 and the access points 109 are formed using relatively high radio frequencies, and specifically mm wave radio communication is used. For example, the wireless links may be formed by radio communications using the 60 GHz frequency band. mm wave communications may specifically be communication in the 20 GHz to 300 GHz frequency range.

The wireless modems 111, 113 are in the example individual nodes in the network configuration and have individual MAC addresses. Data packets can be addressed to the individual modems by other network entities, such as routers or switches, using the individual MAC addresses. A communication link is established from an access point 109 to a wireless modem 111 using the MAC addresses of the AP 109 and the modem 111, and similarly for a link to modem 113 but using the MAC address of modem 113.

In a specific embodiment of using the IEEE 802.11ad wireless technology, the AP and the two modems would form a BSS (basic service set). A scheduler may accordingly allocate data packets to an individual link by associating them with the appropriate MAC address. In particular, each AP may comprise a MAC layer scheduler which performs scheduling of date over the air interface of the AP based on MAC addresses. In many systems, the scheduling is based on a TDMA scheduling allocating time intervals/slots for individual air interface links (in some embodiments allocation may be in fixed duration time slots but in other systems allocation may be in variable duration time slots or intervals).

Radio communications at higher frequencies tend to be more suited for shorter distances and using direct line of sight propagation. Directional beams are employed to increase the link distance, but the maximum distance for the wireless links tends to be relatively limited and each access point 109 will typically only cover a relatively short distance or interval. For example, for a 60 GHz system supporting a train, the coverage from each access points 109 may practically be restricted to e.g. around 300 m to 1 km from the access points 109. Accordingly, the distance between access points 109 will tend to be relatively small with the result that a relatively large number of access points 109 will be employed. For example, along a railway track, access points may be distributed for each, e.g. 500 m–1 km of track.

As a consequence, the radio conditions will tend to change quickly for the wireless modems 111, 113, and specifically the optimum access points 109 to which to connect tend to change quickly, e.g. for a train moving along train tracks at a potentially high speed. Furthermore, the directional radio beam of the wireless modems 111, 113 cannot necessarily be steered over all directions, but may be limited to e.g. a 90 degree range in the horizontal (azimuth) plane. In order to support such scenarios, the system supports handovers between different access points 109 such that a connection from an end node 101 to the fixed network 107 (and the correspondent node 105) can be sequentially supported by different access points 109 and modems 111, 113 as the vehicle/train 103 moves. In order to maximize the separation of the access points, an individual modem can lose connectivity for significant periods of time (for example, it may only be connected to an AP for approximately half of the time), but the connectivity to the vehicle from at least one modem at any one point in time can be maintained.

It is desirable for such handovers to be seamless to the end node 101 such that the communication and the supported service is not interrupted. It is specifically desirable to establish new access point connections before terminating the previous ones (also known as make before break handovers).

However, supporting mobile communications, and, in particular, in situations where the wireless scenario experienced by the mobile unit changes quickly requiring many and frequent handovers, is a very difficult and challenging problem. The challenge tends to be exacerbated for communication systems and networks, such as IP networks, that are not originally designed to support such mobility.

The system of FIG. 1 is arranged to provide efficient and high-performance mobility support for end nodes of a vehicle, such as specifically for end nodes that are comprised in e.g. handheld devices of passengers on a fast moving train.

Figure 2:
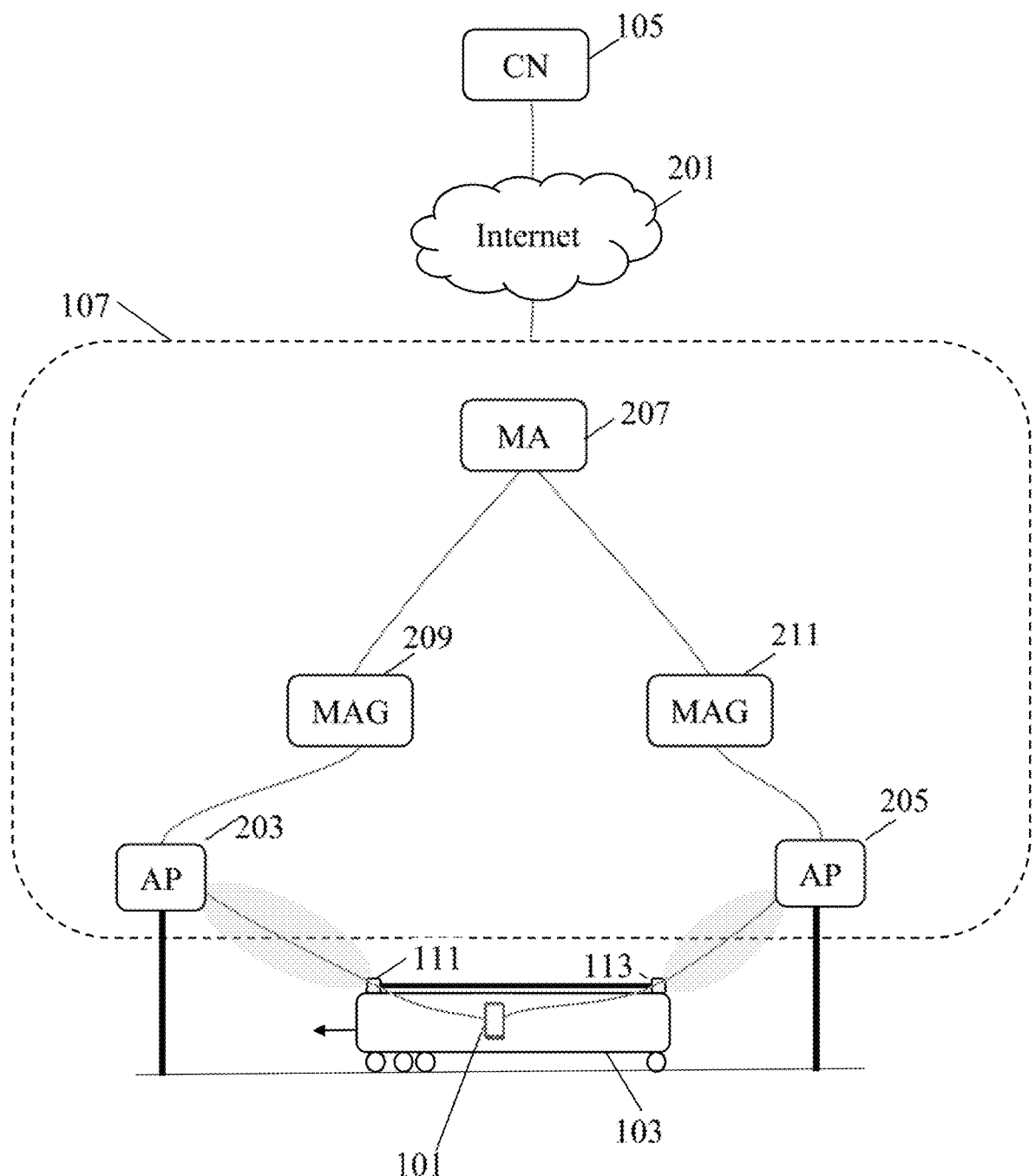
FIG. 2 illustrates an example of elements of a wireless communication system in accordance with some embodiments of the invention.

FIG. 2 which shows an example of a specific scenario of FIG. 1 in which an end node 101 in a train 103 communicates with a correspondent node 105.

In the specific example, the correspondent node 105 is coupled to the fixed network 107 via a connection of the Internet 201 (it will be appreciated that the fixed network 107, as indeed the wireless modems 111, 113, may be considered fully or partially part of the Internet).

FIG. 2 illustrates a specific situation in which the train 103 has simultaneous access to a first access point 203 and a second access point 205 of the access points 109 via a pair of wireless modems of the wireless modems 111, 113. In the specific situation, one wireless modem 111 has established a wireless link with the first access point 203 and another wireless modem 113 has established a wireless link with the second access point 205.

The end node 101 and corresponding node 103 have established a data session which is supported by the fixed network 107. For example, the correspondent node 105 may operate a web server providing a web service to a client running on a device implementing the end node 101. As a specific example, a passenger on the train may operate a web browsing application which operates a web browsing client that initiates and supports a web service provided by the correspondent node 105.

The fixed network 107 provides connections that can be used by the client and the server. In order to support the mobility of the fast moving train, the fixed network 107 may in some examples comprise a mobility anchor (MA) 207 which operates as a fixed anchor for the mobile nodes of the train 103. Specifically, the mobility anchor 207 operates as a common fixed anchor in the fixed network 107 for all the wireless modems 111, 113 of the train 103.

The mobility anchor 207 may provide a common node for all connections and communication paths from the correspondent node 105 to the end node 101 regardless of which of the access points 109 and wireless modems 111, 113 support the communication.

Accordingly, all data from the correspondent node 105 to the end node 101 for the data session may be routed via the mobility anchor 207 regardless of the wireless link that is used on the air interface between the access points 109 and the train. This may for example be achieved by the mobility anchor 207 advertising that it is a mobility anchor 207 for the wireless modems 111, 113 (or other nodes on the train 103) such that any datagrams addressed to any of these nodes will be routed to the mobility anchor 207.

Similarly, all data from the end node 101 to the correspondent node 105 for the data session may be routed via the mobility anchor 207 regardless of the wireless link that is used on the air interface between the access points 109 and the train 103.

The system may accordingly operate a mobility anchor functionality which provides a fixed anchor point for the mobile nodes of the train 103. The mobility anchor 207 will perform mobility management which includes keeping track of which access points 109 the wireless modems 111, 113 are currently connected to, and updating the routing path for the individual wireless modems 111, 113 and the end node 101 when conditions change. Thus, when the train moves and the individual modems dynamically switch/handover to different access points 109, the mobility anchor 207 will register the resulting changes and update the communication path for the individual connection/flow.

In the example of FIG. 2, each of the access points 203, 205 is coupled to a Mobile Access Gateway 209, 211. Each Mobile Access Gateway 209, 211 is typically linked with a plurality but not all of the access points 203, 205. Indeed, each MAG 209, 211 may be associated with a different segment of the network.

The mobility anchor 207 is accordingly a common mobility anchor for a plurality of the wireless modems 111, 113 of the train 103, and typically for all of the wireless modems 111, 113.

In many practical systems, some or all of the access points 109, 203, 205 may be substantially colocated and coupled together through network entities that allow short routing paths between them.

Figure 3:
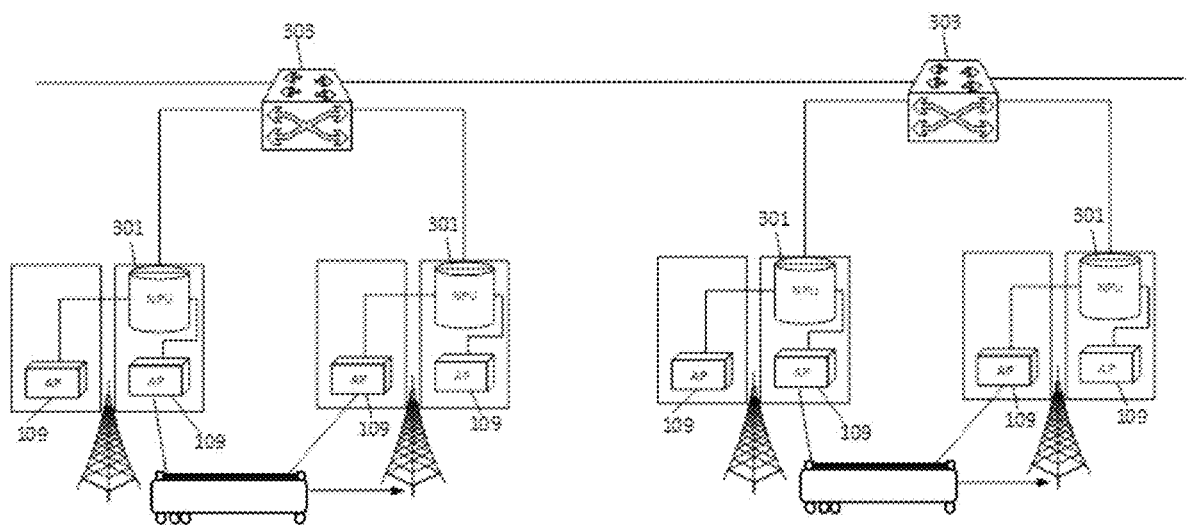
FIG. 3 illustrates an example of elements of a wireless communication system in accordance with some embodiments of the invention.

In many embodiments, such as e.g. illustrated by FIG. 3, two access points 109 may typically be colocated (e.g. on the same mast) with directional beams being used to provide coverage in different, and typically opposite directions.

The colocated access points 109 may often be coupled to each other and the rest of the fixed network 107 by a suitable network entity, such as a Network Processing Unit (NPU 301). The NPU 301 may for example allow easy routing of data from one access point to another, and may control whether data packets are routed between the end node and the fixed network via one or the other of the colocated access points 109.

Further, in many systems, the different access points 109 may be coupled together via switches or routers 303 that e.g. may provide a short and direct routing between access points 109 and NPUs 301. This may often facilitate routing and handovers when the vehicle moves as the required modification of routing can be reduced and localized to a higher degree. The switches or routers 303 may further connect to the rest of the fixed networks, e.g. through interface routers/switches 305.

Figure 4:
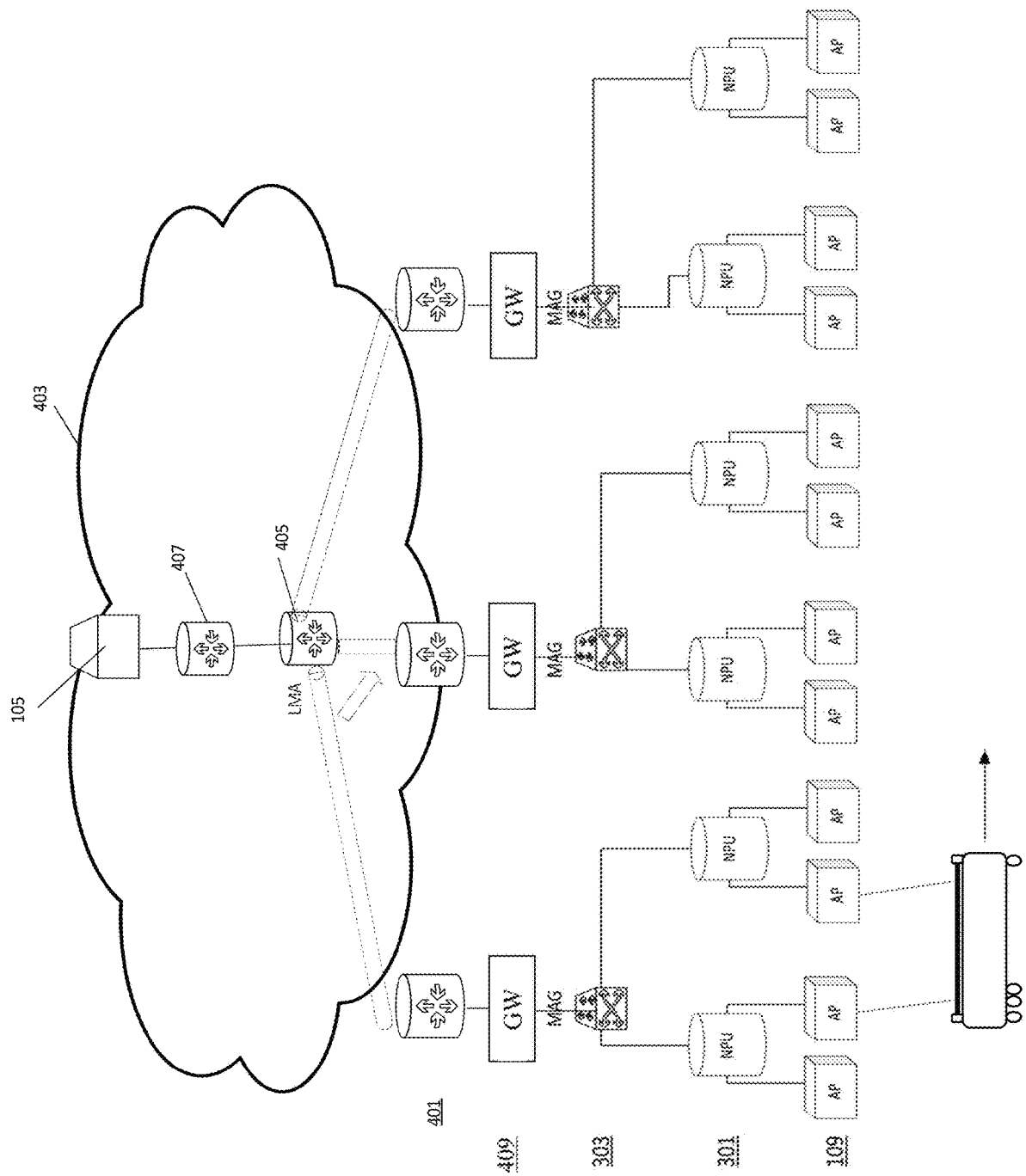
FIG. 4 illustrates an example of elements of a wireless communication system in accordance with some embodiments of the invention.

FIG. 4 illustrates a specific example of a possible network where pairs of access points 109 are colocated and supported by an NPU 301. A plurality of NPUs 301 may be coupled to a network switch 303 which may provide the MAG for that plurality of NPUs 301. Other network switches may support other access points 109 and provide a MAG for those access points 109.

In many embodiments, such a system of access points 109 and supporting network functions (e.g. switches and NPUs) may be proprietary and aimed at a specific scenario, such as supporting a train along a track. Such a proprietary system may accordingly provide a number of interface points with capability of providing a MAG function for the moving vehicle. The system may for example provide a proprietary access network that may be coupled to other networks via suitable interface connections and gateways.

For example, each of the interface points may be coupled to an edge router 401 of a core network 403 being part of the fixed network 107. The core network 403 may be a general non-proprietary network such as e.g. the Internet. In some embodiments, the MAG function may be provided in the edge router (or possibly another element of the core network). Another router 405 of the core network 403 may provide a MA (Mobility Anchor) function allowing routing of data to and from the MAG as appropriate. The correspondent node 105 may communicate with the MA through a suitable route, typically including a number of routers 407.

Figure 5:
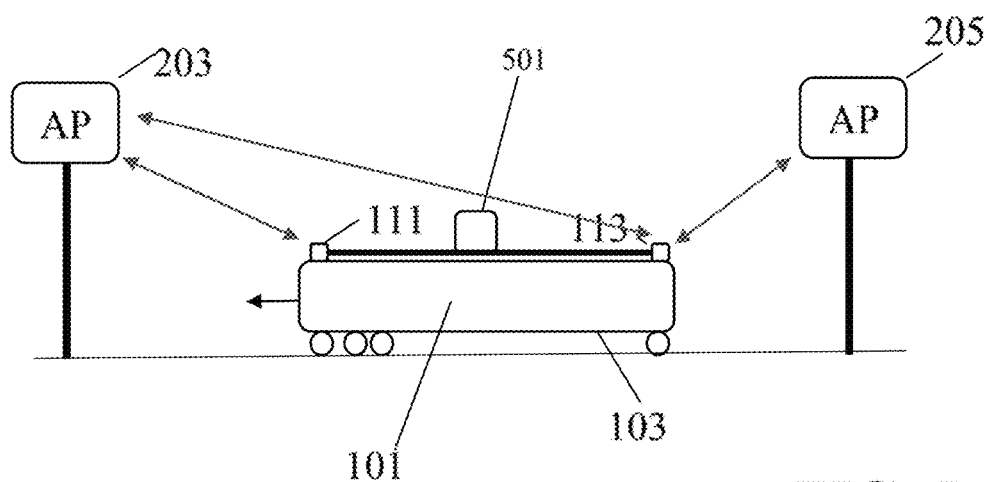
FIG. 5 illustrates an example of elements of a wireless communication system in accordance with some embodiments of the invention.

In some embodiments, the end node 101 may directly be connected to the wireless modems 111, 113 e.g. by a direct wireless link. However, in many embodiments, the wireless modems 111, 113 may as illustrated in FIG. 5 be coupled to a network element 501 or a network through which the connection with the end node 101 is formed. Thus, the wireless modems 111, 113 may be part of a vehicle network that supports communication for end nodes. The network may for example include IEEE 802.11 network elements and access points for the end nodes.

Figure 6:
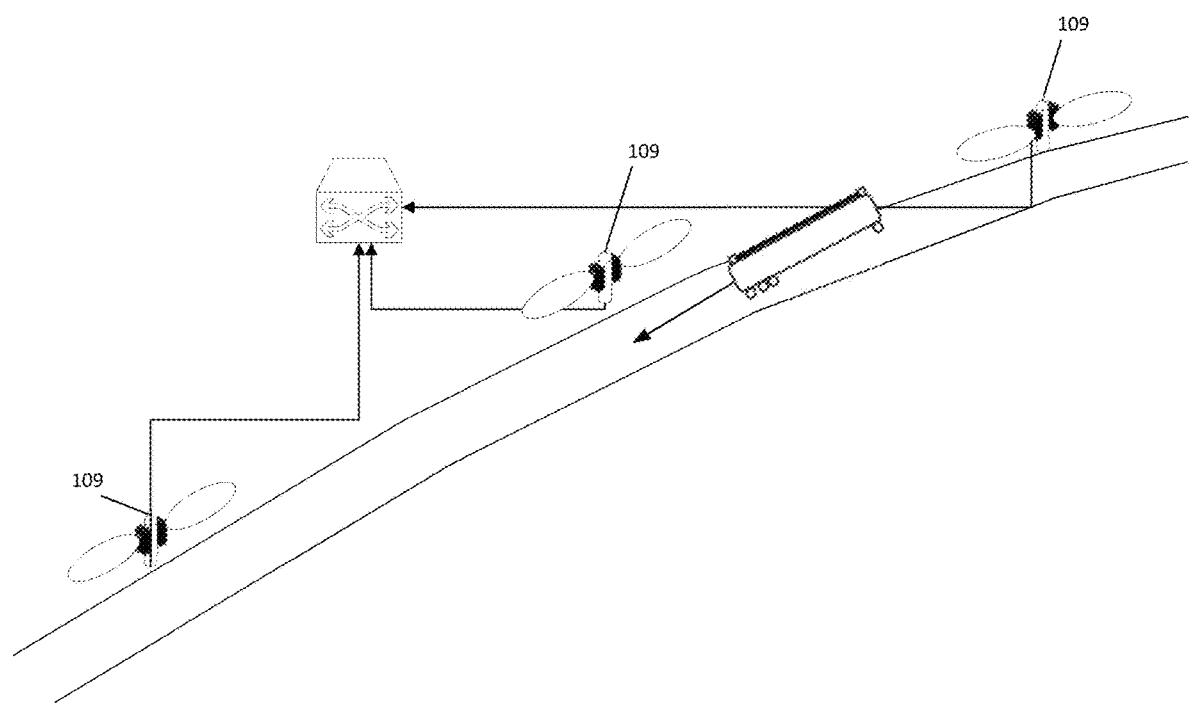
FIG. 6 illustrates an example of elements of a wireless communication system in accordance with some embodiments of the invention.

As previously mentioned, in many systems, the access points 109 may be arranged with a plurality of access points 109 being substantially colocated. For example, often pairs of access points 109 are colocated on a mast along the route covered. The access points 109 may use directional antenna arrangements to provide different coverage areas. For example, as illustrated in FIG. 6, two colocated access points 109 may have directional antenna beams that are substantially in opposite directions, and typically in different directions along the track being covered (e.g. in opposite directions of the track or road being covered).

Thus, some or all of the access points 109 may comprise directional antennas which are arranged to steer beams towards the wireless modems of the vehicle. In some embodiments, a static beam forming may be used with the beam formed being constant in a given direction. For example, one access point 109 may permanently direct a beam down a track and another colocated access point 109 may permanently direct a beam up the track in the other direction. A vehicle downstream from the position may then be connected via a wireless link with the first access point 109 and a vehicle upstream from the position may then be connected via a wireless link with the second access point 109.

In many embodiments, the access points 109 may be arranged to dynamically and electronically steer the beams, and specifically may be arranged to steer them towards respectively the wireless modems. A beam may indeed by steered individually for each wireless link and may dynamically be updated to be directed towards the wireless modem supporting the link. The updating may for example be by updating antenna array coefficients in response to received parameters as well known in the art.

In the examples previously described, two wireless modems 111, 113 were used to establish links between the vehicle/train 103 and the fixed network 107. The two wireless modems 111, 113 are in the examples positioned towards opposite ends of the vehicle/train 103. In some embodiments, the vehicle/train 103 may comprise more wireless modems and in particular it may in many embodiments be advantageous to have a plurality colocated wireless modems. This may specifically be advantageous if the colocated modems are arranged to form beams in different directions and/or freely/separately/independently of each other.

In particular, in many embodiments, rather than having a single wireless modem towards the front of the vehicle/train, there may be two wireless modems forming beams respectively in the forwards and in the backwards direction. Similarly, rather than having a single wireless modem towards the back of the vehicle/train, there may be two wireless modems forming beams respectively in the forwards and in the backwards direction. Thus, in such an example, there may be four links available such as e.g. often two links from respectively the front and the back of the vehicle/train pointing towards an access point ahead of the vehicle/train and two links from respectively the front and the back of the vehicle/train pointing towards an access point behind the vehicle/train. In some systems, there may be implemented a scheduling function which freely and dynamically can allocate data over the four different air interface links thereby allowing these to be fully optimized.

Figure 7:
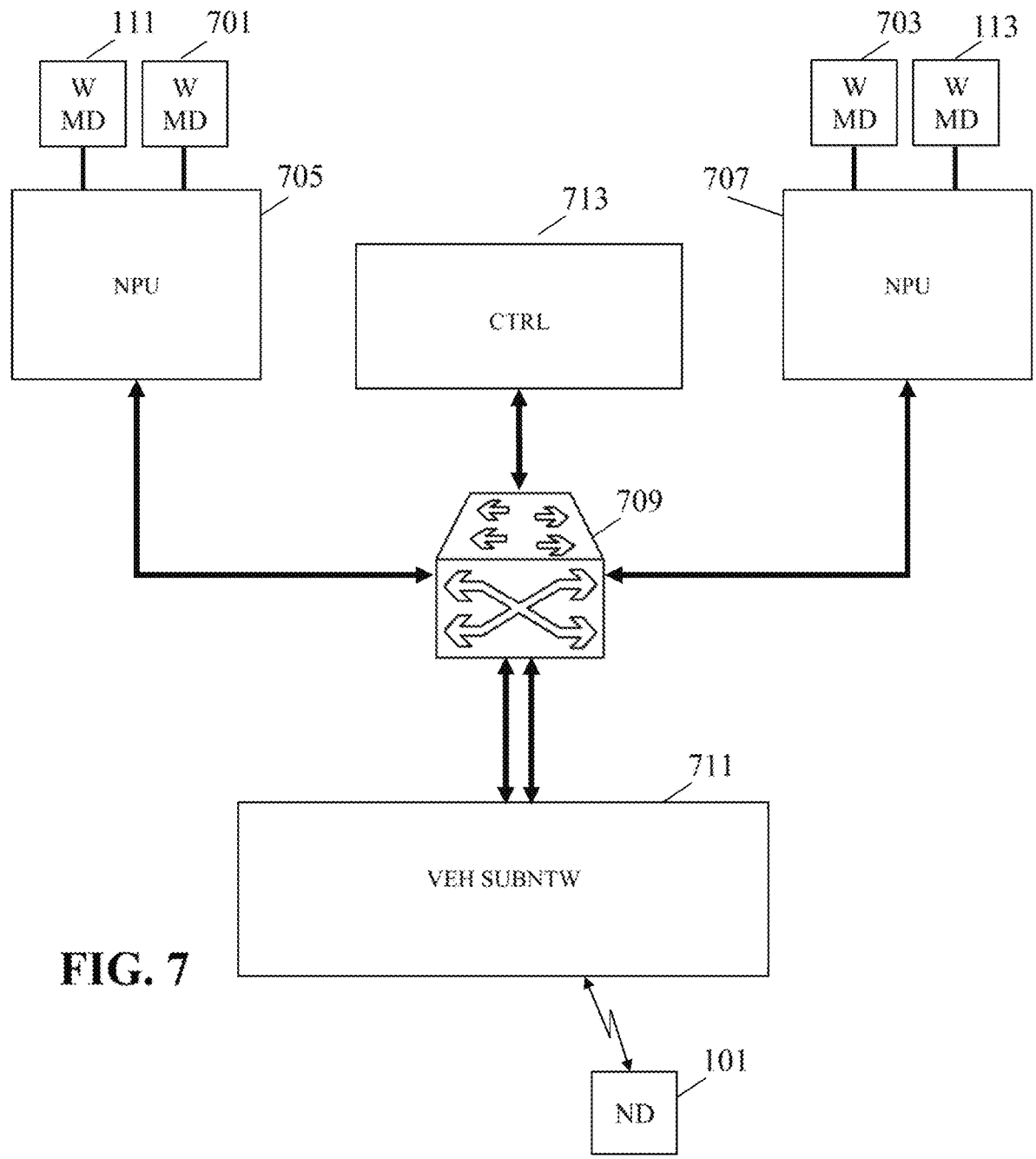
FIG. 7 illustrates an example of elements of a vehicle based network subsystem of a wireless communication system in accordance with some embodiments of the invention.

FIG. 7 illustrates an example of a vehicle network of the vehicle. The vehicle network may include all elements of the communication system which is located on the vehicle/moves with the vehicle.

In the example of FIG. 7, the vehicle network comprises four wireless modems 111, 113, 701, 703 being arranged into colocated pairs with one pair of colocated wireless modems 111, 701 being towards the front of the vehicle and the other pair of colocated wireless modems 113, 703 being located towards the rear of the vehicle.

The first pair of wireless modems 111, 701 are coupled to a first NPU 705 and the second pair of wireless modems 113, 703 are coupled to a second NPU 707. The NPUs 705, 707 are coupled to a switch 709 which is further coupled to a vehicle subnetwork 711 which supports end nodes on the vehicle such that these can interact with the remaining parts of the communication system. The vehicle subnetwork 711 provides access points to the end nodes on the vehicle and allow them to communicate with remote nodes of the fixed part of the communication system via the wireless modems 111, 113, 701, 703, It may in the example provide routes to the wireless modems via the switch 709 and NPUs 705, 709 but it will be appreciated that in other embodiments other configurations may be possible and the vehicle subnetwork 711 may directly be coupled to the wireless modems 111, 113, 701, 703. In the specific example, the NPUs 705, 707 and vehicle subnetwork 711 may specifically be coupled to the switch 709 via Ethernet connections and the switch 709 may be an Ethernet switch.

It will be appreciated that the vehicle subnetwork 711 may include and implement various other network functions including resource control, scheduling and allocation functions, routing adaptation, data session setup functionality etc. The vehicle subnetwork 711 may implement any appropriate network function required or desired for the implementation of a vehicle network that can support vehicle based end nodes and which can communicate and interface with the fixed network and access points.

The vehicle subnetwork 711 may in many embodiments consist in or comprise a Wi-Fi subsystem. The WiFi subsystem may e.g. provide wireless WiFi access throughout the vehicle, such as throughout a train, and may itself comprise WiFi access points, routers etc. Thus, a user of the end node 101 may simply connect to a local WiFi subsystem 711 (and specifically a conventional WiFi access point) to access the core network and the correspondent node 105. The WiFi subsystem may for example be a conventional WiFi system such as an IEEE 802ac (or earlier) system.

Thus, a user on a moving vehicle, such as a train, may simply access a conventional local WiFi access point to gain Internet access.

In the system described, the wireless modems employ electronically steerable beamforming directional antenna that form a beam, and more specifically that form a directional pattern having a main beam that can be steered. Further, in the example two colocated wireless modems may employ directional antennas that may form a beams in different directions, such as e.g. in a forwards direction or range of directions and a backwards direction or range of directions respectively.

For example, in the example of FIG. 7, the two co-located wireless modems 111, 701 may employ electronically steerable beamforming directional antennas that are directed in substantially opposite directions, specifically in the direction of movement and in the opposite direction of movement, specifically one directional antenna may be directed in the forwards direction of the vehicle and the other being pointed in the backwards direction of movement. Similarly, the other two co-located modems 113, 703 may employ directional antennas that are also directed in opposite directions, specifically in the direction of movement and in the opposite direction (forward/backwards). This may result in two wireless modems 111, 703 having beams formed generally in the forward direction (direction of movement) and two modems 113, 701 having beams formed generally in the backward direction.

Thus, the different pairs/sets of colocated wireless modems may each comprise a wireless modem arranged to form a beam in substantially the same direction as a wireless modem of another pair/set of colocated wireless modems.

In many embodiments, the wireless modems may comprise a beam adapter which is arranged to adaptively steer the main beam of the electronically steerable beamforming directional antenna towards the appropriate access point. It will be appreciated that many different approaches and algorithms are known for steering a beam towards a desired transmitter and/or receiver and that any suitable approach may be used.

For example, the wireless modems may comprise an electronically steerable beamforming directional antenna in the form of an antenna array for forming a main directional beam and the wireless modems may comprise a beam adapter which dynamically is arranged to adapt the individual antenna phase and amplitude coefficients to direct the main beam towards the relevant access points, e.g. by applying a beam steering algorithm maximizing the received signal strength or signal to noise ratio as is well known in the art. As another example, more mechanical solutions may be used. For example, a horn antenna being electronically steerable using a stepper motor with electronic control may be used.

For two wireless modems connected to the same access point, such a steering may automatically and inherently result in the beams being formed in substantially the same direction for at least most locations. Specifically, when the distance between the wireless modems is small compared to the distance to the access point (say at least 5 or 10 times lower), the directions are inherently in substantially in the same direction. This will in most applications be the case for the majority of locations of the vehicle. The beam forming of two wireless modems towards the same point (and specifically access point) will be in substantially the same direction for a distance to the vehicle being at least 5 or 10 times greater than a distance between the wireless modems.

Thus, such an adaptive steering may not only result in improved link quality for the individual link as the beam may be dynamically optimized, but may also inherently ensure that the beams of the different wireless modems are formed in substantially the same direction, and specifically are formed towards the same access point, for most locations of the vehicle.

The wireless modems having beams pointing in the same direction may be suitable for forming wireless links with the same access point 109. For example, the two wireless modems having beams pointing in the forwards direction may both be suitable for establishing a wireless link with an access point 109 further ahead along the route/track. Similarly, the two wireless modems having beams pointing in the backwards direction may both be suitable for establishing a wireless link with an access point 109 being further backwards along the tracks.

Figure 8:
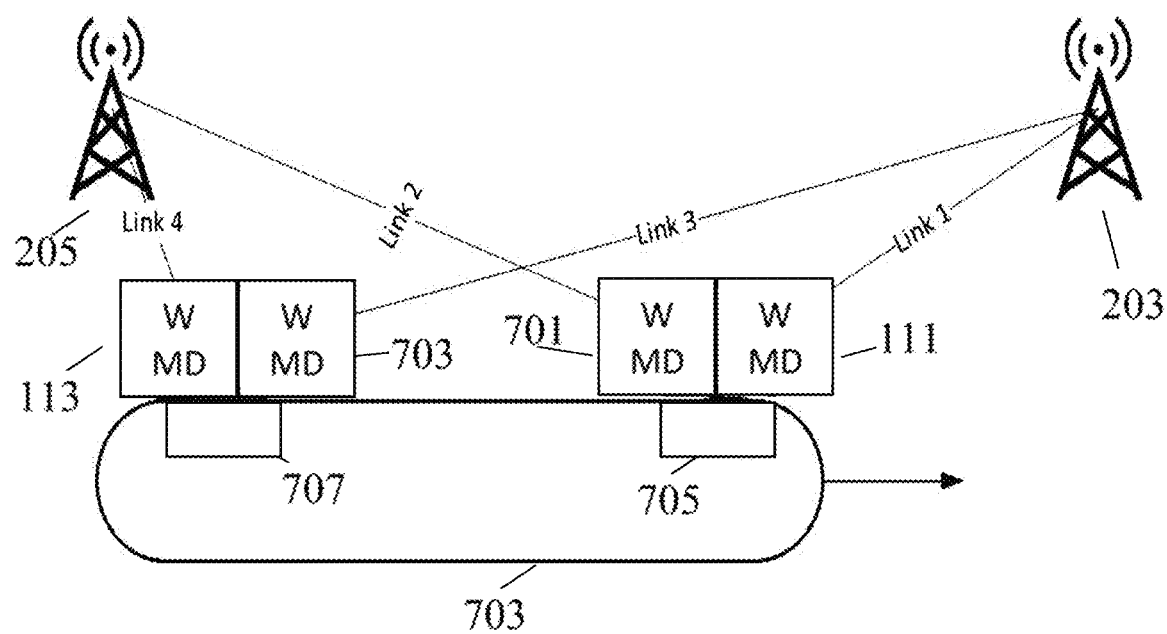
FIG. 8 illustrates an example of elements of a wireless communication system in accordance with some embodiments of the invention.
Figure 9:
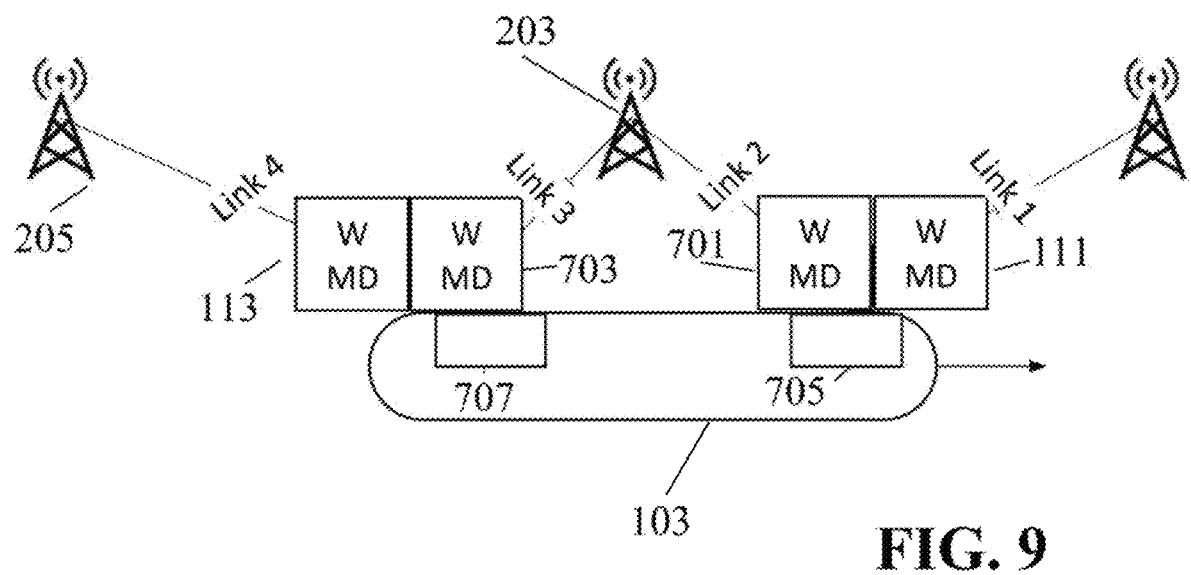
FIG. 9 illustrates an example of elements of a wireless communication system in accordance with some embodiments of the invention.

Similarly, the beam steering may be towards an access point rearwards of the vehicle/train 103 and this may indeed be simultaneous with another of the colocated wireless modems steering a beam towards a forward access point. Thus, often a situation may occur where one set of colocated wireless modems have established links with respectively a forwards and rearwards access point and thus forms beams in substantially opposite directions. At the same time, the other set of colocated wireless modems may have established links with respectively a forwards and rearwards access point and thus also form beams in substantially opposite directions. Further, one pair of non-colocated wireless modems may form beams towards the forwards access point and thus substantially in the same forwards direction, and another pair of non-colocated wireless modems may form beams towards the rearward access point and thus substantially in the same rearwards direction. Such an example is shown in FIG. 8. The establishment of a link may mean that the modem is associated to an access point. The link is available for sending data in either direction. FIG. 9 illustrates an example where the four wireless modems 111, 113, 701, 703 have formed simultaneous links with three different access points.

The vehicle may typically comprise a plurality of sets of colocated wireless modems. In many embodiments, the sets may be positioned at some distance to each other, such as specifically towards opposite ends of the vehicle. In many embodiments, different wireless modems in different sets may be arranged to form beams in corresponding directions. For example, each set may comprise one wireless modem facing in the forwards direction and one wireless modem facing in the backwards direction. In such scenarios, wireless modems in different sets being arranged to form beams in corresponding and typically substantially in the same directions will be referred to as aligned wireless modems.

Aligned wireless modems will typically be at a distance with respect to each other. In many embodiments, the distance between at least two aligned wireless modems of the vehicle will be no less than 5 m, 10 m, 20 m, 50 m, or even 100 m. In many embodiments, at least two aligned wireless modems will be disposed towards opposite ends of the vehicle, for example at the front and back of a bus or on respectively the first and last carriage of a train. Thus, at least two aligned wireless modems will be positioned proximal to opposite ends of the vehicle. In many embodiments, the distance between at least two aligned wireless modems may be no less than 5, 10, or 100 times greater than a distance from each of the two aligned wireless modems to the nearest of the front and of the back of the vehicle. Thus, in many embodiments, the distance between at least two aligned wireless modems may be no less than 5, 10, or 100 times greater than a distance from the front of the vehicle to the nearest of the two aligned wireless modems. Similarly, in many embodiments, the distance between at least two aligned wireless modems may be no less than 5, 10, or 100 times higher than a distance from the back of the vehicle to the nearest of the two aligned wireless modems.

In contrast to the aligned wireless modems, non-aligned wireless modems may often be positioned close to each other and specifically may typically be positioned such that a pair (or set) of non-aligned aligned wireless modems are substantially co-located. For example, in the specific embodiment described, a pair of forward facing aligned wireless modems are positioned at respectively the front and back of the vehicle, and similarly a pair of rearward facing aligned wireless modems are positioned at respectively the front and back of the vehicle. Further, the forward and backwards facing wireless modems at the front of the vehicle may be substantially co-located, and the forward and rearward facing wireless modems at the rear of the vehicle may be substantially co-located. This colocation may facilitate operation and specifically allow shared network functionality, such as e.g. the colocated non-aligned wireless modems sharing a common NPU for coupling to e.g. an Ethernet switch.

The aligned wireless modems are accordingly at a substantial distance to each other. As the beams are in the same direction, all aligned modems may potentially connect to the same access point and thus multiple wireless communication links may be set up from the vehicle/train to a given access point. Further, due to the distance between the aligned wireless modems, the properties of the wireless links will typically be substantially different and will vary in different ways. Indeed, even in scenarios where the average propagation characteristics to different aligned wireless modems is substantially the same (e.g. the vehicle is far from the access point), the instantaneous conditions may be very different and vary in a typically independent and substantially uncorrelated way. The performance of the individual links will differ because of difference in path loss and fading (fast fading or shadowing) and radio and antenna performance.

In the described system, each of the access points operates in a single frequency channel, i.e. each of the access points is allocated a frequency channel. The frequency channels typically have a large frequency bandwidth, and typically the bandwidth exceeds 500 MHz. The access points may specifically operate in accordance with IEEE 802.11ad Specifications with each frequency channel having a bandwidth of 2160 MHz. Within each frequency channel, different links may be setup, e.g. using TDMA or e.g. with the frequency channel bandwidth being divided into subchannels of smaller bandwidths.

The system may accordingly employ a frequency plan with each access point being allocated one frequency channel. In typical systems, the number of available frequency channels is substantially limited, for example in IEEE 802.11ad there may only In the system, the beacon signal is transmitted during beacon time slots of the allocated frequency channel and comprises various data that can be extracted and received by wireless modems.

In particular, in accordance with IEEE 802.11ad beacon transmissions are transmitted in relatively short time slots. In more detail, each access point is allocated a frequency channel and this frequency channel is divided into different time intervals of a repeating time frame known as a Beacon Interval BI. The repeating time frame includes a beacon time interval used for beacon transmissions known as a Beacon Header Interval BHI for IEEE 802.11ad, and a time interval used for data transmissions, known as a Data Transmission Interval DTI for IEEE 802.11ad.

Figure 10:
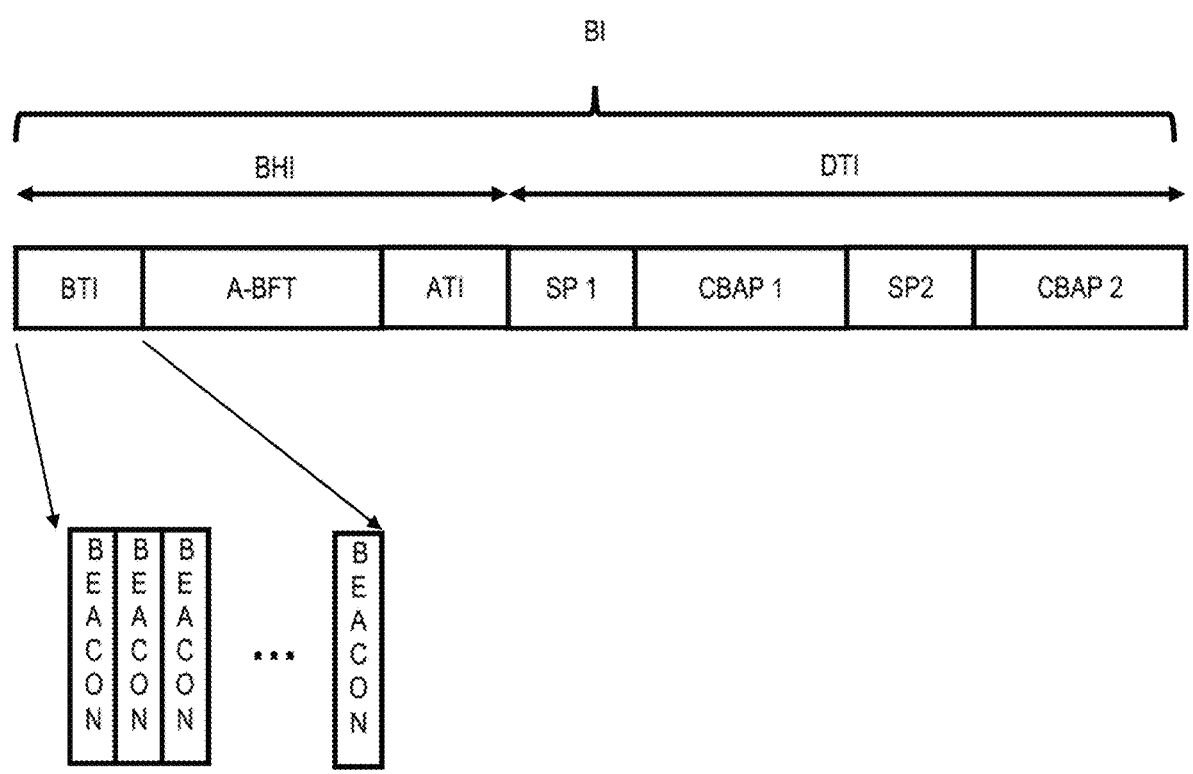
FIG. 10 illustrates an example of a repeating time frame for a wireless communication system in accordance with some embodiments of the invention.

The beacon transmissions occur during time slots of the beacon time interval. In IEEE 802.11ad, the BHI includes a time interval, known as a Beacon Time Interval, BTI, comprising beacon time slots for transmission of beacon data, a time interval, known as association beamforming training time A-BFT, for transmission of beamforming training data, and an a time interval, known as an Announcement Transmission Interval ATI, for transmission of. An example of a Beacon Interval for IEEE 802.11ad is shown in FIG. 10

In some systems, a beacon transmission may be repeated in multiple time slots within a beacon time interval. For example, in IEEE 802.11ad, the access point may retransmit the beacons in different directions in different beacon time slots, and specifically the access point may be capable of transmitting beacons in different sectors served by the access point.

A station seeking to detect and identify a candidate access point will scan for beacon transmissions. It will seek to detect and receive a beacon transmission in the appropriate frequency channel. However, as the beacon transmissions are only transmitted relatively infrequently, such as typically only once per sector per BI for an IEEE 802.11ad system, it may take some time for a beacon to be received even if the transmission from the access point reaches the station.

The functionality required for scanning and detecting a beacon signal is substantial and requires a radio circuit that is dedicated to the scanning when scanning is performed. In order to reduce complexity and cost, wireless modems are typically arranged to only perform one radio function at a time, i.e. it may be arranged to either communicate in one frequency channel, to scan for a beacon signal in one frequency channel, or to extract data from a frequency channel. Typically, each wireless modem comprises one radio circuit and this can be used for either of these functions. However, typical designs do not allow more functions to be performed simultaneously or e.g. multiple frequency channels to be processed simultaneously.

Accordingly, wireless modems are typically only able to scan for beacon signals in one frequency channel at a time. In order to reduce the time required for detection of beacon signals, the wireless modem may be provided with information of which frequency channel to scan for beacon signals. For example, in some embodiments, all upstream access points may be allocated frequency channel 6 and all downstream access points may be allocated frequency channel 5. Accordingly, a forward directed wireless modem for a train/vehicle moving in the upstream direction may be configured to search for a beacon signal in frequency channel 5 as this wireless modem will seek to access an access point with a beam formed in the downstream direction towards the train/vehicle. Accordingly, such a wireless modem may be arranged to relatively quickly and easily detect beacons from access points having beams pointing towards the vehicle as it moves upstream. Conversely, a wireless modem for a train/vehicle moving in the downstream direction may be configured to search for a beacon signal in frequency channel 6. Accordingly, such a wireless modem may be arranged to relatively quickly and easily detect beacons from access points having beams pointing towards the vehicle as it moves downstream.

In some systems and practical deployments, it may be desired to provide a communication capacity for a given area in excess of that which can be provided by a single access point, or e.g. in the described system by a combination of an upstream access point and a downstream access point. An approach that may increase such capacity may be to provide an additional access point that has an overlapping coverage area with an existing access point. For example, a second downstream (or upstream) access point may be added to a mast already carrying a downstream and upstream access point. The additional access point with overlapping coverage area may be allocated a different frequency channel than the original access points, for example an additional upstream access points may be allocated frequency channel 4 and additional downstream access points may be allocated frequency channel 3

Figure 11:
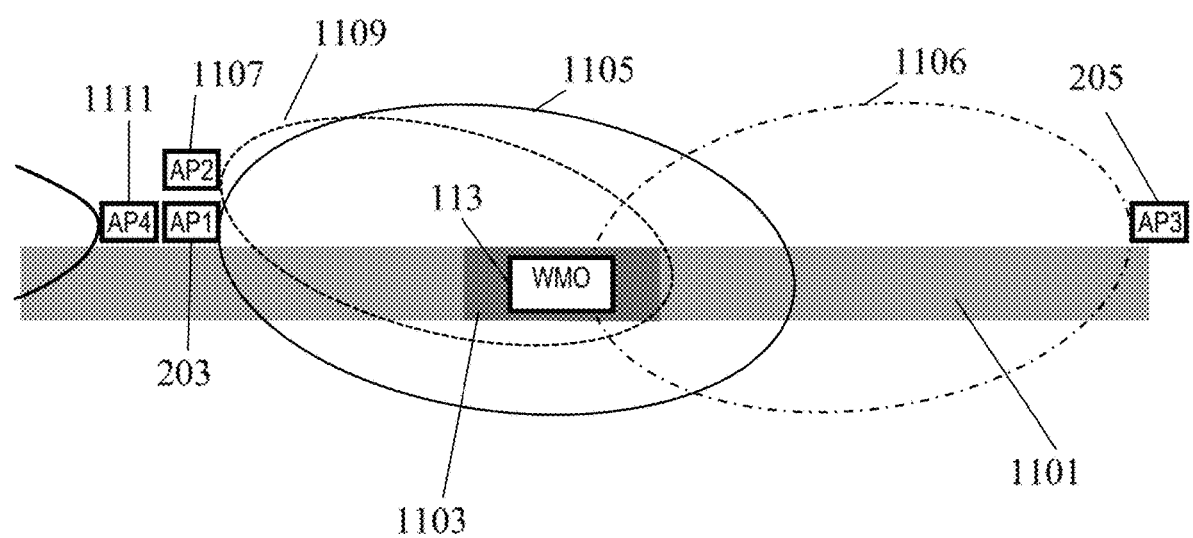
FIG. 11 illustrates an example of elements of a wireless communication system in accordance with some embodiments of the invention.

FIG. 11 illustrates an example of such an arrangement where a downstream access point 203 and an upstream access point 205 cover an area of a predetermined path 1101 which in the example is a train track. In the example, the predetermined path 1101 between the two access points 203, 205 comprise a part 1103 where it is desired that even higher capacity is available. In the specific example, the track between the two access points 203, 205 comprises a station where trains may stop for longer periods and where multiple trains may be present at the same time. Thus, whereas the system design may be such that the one access point is sufficient to support a single train in each direction, and thus be designed to support moving trains by subsequent trains being further apart than the access point inter-distance, a single access point may not be sufficient to simultaneously support multiple vehicles stationary at the station.

In the example, the first downstream access point 203 has a coverage area 1105 which covers the station area 1103 and the first upstream access point 205 has a coverage area 1106 which only marginally covers a part of the station area 1103. Thus, in the example, the station area 1103 is substantially only covered by the first downstream access point 203 which however cannot provide the desired capacity for the number of vehicles that may be present at the station.

In order to provide additional capacity for the station area 1103, the system further comprises a second downstream access point 1107 which in the example is colocated with the first downstream access point 203 and which has a coverage area 1109 that is overlapping the coverage area 1105 of the first downstream access point 203. In the example, the second downstream access point 1107 is mounted on the same mast as the first downstream access point 203. In the example, the mast further carries an upstream access point 1111 which forms a beam supporting vehicles upstream of the mast.

The second downstream access point 1107 is allocated a different frequency channel than the first downstream access point 203 thereby allowing a wireless modem 111 of the vehicle to utilize the first downstream access point 203 or the second downstream access point 1107 by selecting the appropriate frequency channel.

The approach may provide substantial advantages e.g. over providing a higher density of downstream/upstream access points using the same frequency (with the coverage area being reduced). For example, in some embodiments, it is not practical for coverage areas to be so small that they only cover a part of e.g. a station. Further, such access points will tend to have increased interference and small cells/coverage areas and therefore the approach will tend to require many and possibly quick handovers. These issues particularly render such an approach disadvantageous for mm wave communication, and specifically using beamforming antennas, where propagation conditions are extreme and e.g. handovers tend to take longer.

However, the approach of using additional access points with a different frequency channel that may not follow the predetermined frequency channel approach of allocating a fixed predetermined frequency channel for upstream and on fixed predetermined frequency channel for downstream, poses a number of challenges and difficulties.

One issue is that of how to detect that additional access points are available for selection and access. This should preferable be achieved without introducing undesirable effects such as additional complexity, resource requirements, or performance degradations, such as increased delays in identifying and accessing points (e.g. resulting from delays in detecting beacons). Such effects may be even more challenging for systems where e.g. a single frequency channel is scanned by the wireless modem.

Another issue is that of how to ensure that the different wireless modems and vehicles access appropriate access points such that the available capacity is efficiently used. In particular, load balancing across the access points is critical and may be difficult to achieve. Such issues are also more challenging in mm wave systems such as IEEE 801.11ad, where access points tend to operate independently, and the fixed network does not include overall or centralized load balancing functions. Independent operation of the access points eliminates the need to configure neighbor access point information at the access point which would need to be updated whenever a new access point is installed or removed. It also eliminates the need for a communication control path between the access points over wired links.

In the following an approach will be described which seeks to mitigate or reduce such effects and which in general seeks to provide improved performance and/or facilitated implementation.

The approach may use a hierarchical arrangement of two access points providing overlapping coverage for an area where one of the access points uses a first frequency channel and transmits information indicating that a second access point may be available with overlapping coverage area. Such access points will be referred to paired access points and the individual access points will also be referred to as respectively primary access points and secondary access points (with primary access points providing an indication of the secondary access point in the transmitted beacon signal, and with the primary access point typically using a predetermined fixed frequency channel).

An example of the approach will be described with reference to the scenario of FIG. 11 and with the first downstream access point 203 and the second downstream access point 1107 forming such a hierarchical arrangement of a pair of a primary access point and a secondary access point respectively.

Figure 12:
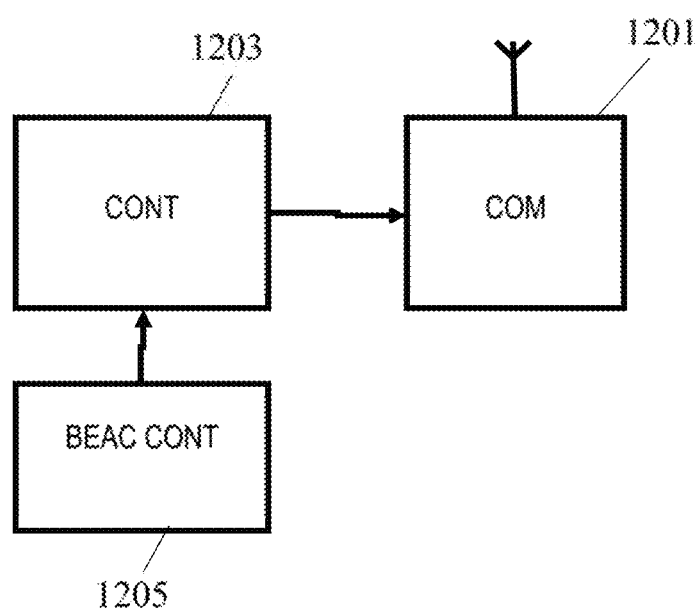
FIG. 12 illustrates an example of an access point for a wireless communication system in accordance with some embodiments of the invention.

FIG. 12 illustrates an example of a first downstream access point 203. In the example, the first downstream access point 203 comprises a communicator 1201 which is arranged to transmit and receive over the air interface using a first frequency channel. The transmitter is coupled to an access point controller 1203 which is arranged to perform all the required functions for communicating with a wireless modem over the first frequency channel, including transmitting and receiving data, implementing a time frame structure, providing data buffer functionality, implementing error control and correction, etc. The access point controller 1203 is coupled to a beacon transmit controller 1205 which is arranged to control the access point controller 1203 to transmit a beacon signal where the beacon signal is a modulated signal comprising beacon data. The beacon transmit controller 1205 may provide the beacon data to the access point controller 1203 which may perform timing, modulation, etc. to transmit the beacon signal.

The first downstream access point 203 is arranged to transmit a beacon signal which comprises an indication of the first downstream access point 203 itself. In many cases, this may be an identification, such as a network address (e.g. MAC address) or a BSSID (basic service set identifier). In other cases, the identification may be any identifier that allows selection of the first downstream access point 203 as an access to the fixed network.

The first downstream access point 203 is further arranged to include data in the beacon signal which comprises a load value indicative of a loading of the first downstream access point 203 itself. The load value may be indicative of an amount of capacity of the available capacity of the access point that is currently used. The load value may for example be a percentage of available capacity used, a number of remote stations/wireless modems currently being associated with the first downstream access point 203 (i.e. the number of wireless modems for which links have been established), a number of vehicles currently supported etc.

In addition, the first downstream access point 203 is arranged to include beacon data providing an indication of a wireless access point that has an overlapping coverage with the first downstream access point 203, i.e. it may provide an indication of the second downstream access point 1107.

In some embodiments, this indication may simply indicate that an overlapping access point exists that uses a different frequency channel. However, in most embodiments, the beacon data may provide a more specific indication that allows (or facilitates) the overlapping access point to be detected by wireless modems. For example, the beacon data may include an indication of the frequency channel that is used by the overlapping access point. Thus, in the specific example, the beacon data includes an indication of the second downstream access point 1107, and may specifically include an indication of the second frequency channel used by the second downstream access point 1107.

Figure 13:
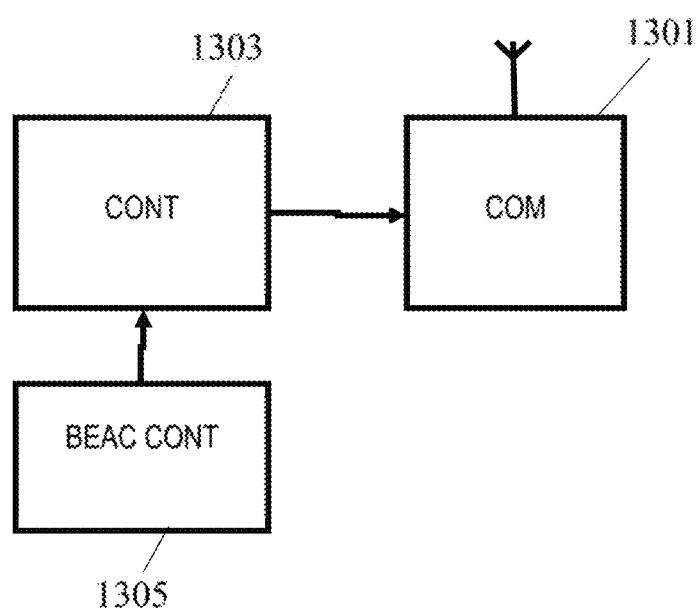
FIG. 13 illustrates an example of an access point for a wireless communication system in accordance with some embodiments of the invention.

FIG. 13 illustrates an example of the second downstream access point 1107. The second downstream access point 1107 corresponds closely to the first downstream access point 203 and also comprises a second communicator 1301 for transmitting and receiving over the air interface but using the second frequency channel which is different from the first frequency channel used by the first downstream access point 203. The communicator 1301 is coupled to a second access point controller 1303 which is arranged to perform all the required functions for communicating with a wireless modem over the second frequency channel, including transmitting and receiving data, implementing a time frame structure, providing data buffer functionality, implementing error control and correction, etc. The second access point controller 1303 is coupled to a second beacon transmit controller 1305 which is arranged to control the second access point controller 1303 to transmit a beacon signal where the beacon signal is a modulated signal comprising beacon data. The second beacon transmit controller 1305 may provide the beacon data to the second access point controller 1303 which may perform timing, modulation, etc. to transmit the beacon signal.

The second downstream access point 1107 may further transmit a beacon signal which comprises beacon data, and indeed the beacon data may be equivalent to that transmitted by the first downstream access point 203.

The second downstream access point 1107 may specifically be arranged to include data in the beacon signal which comprises a load value indicative of a loading of the second downstream access point 1107 itself. The load value may be indicative of an amount of capacity of the available capacity of the second downstream access point 1107 that is currently used. The load value may for example be a percentage of available capacity used, a number of remote stations/wireless modems currently being associated with the second downstream access point 1107 (i.e. the number of wireless modems for which links have been established), a number of vehicles currently supported etc.

In many embodiments, the second downstream access point 1107 may further be arranged to transmit a beacon signal which comprises an indication of the second downstream access point 1107 itself. In many cases, this may be an identification, such as a network address (e.g. MAC address) or BSSID. In other cases, the identification may be any identifier that allows selection of the second downstream access point 1107 as an access point to the fixed network.

In some embodiments, the second downstream access point 1107 may also be arranged to include beacon data providing an indication of the first downstream access point 203, such as for example merely that an overlapping access point exists or providing the frequency channel.

The access points and the described functional blocks may be implemented using conventional analog and/or digital circuits, including analog radio circuits, A/D and D/A controllers for converting between digital and analog domains, microcontroller or microprocessor circuits for executing a firmware or software code for implementing the described operations and functions as will be known to the skilled person.

Figure 14:
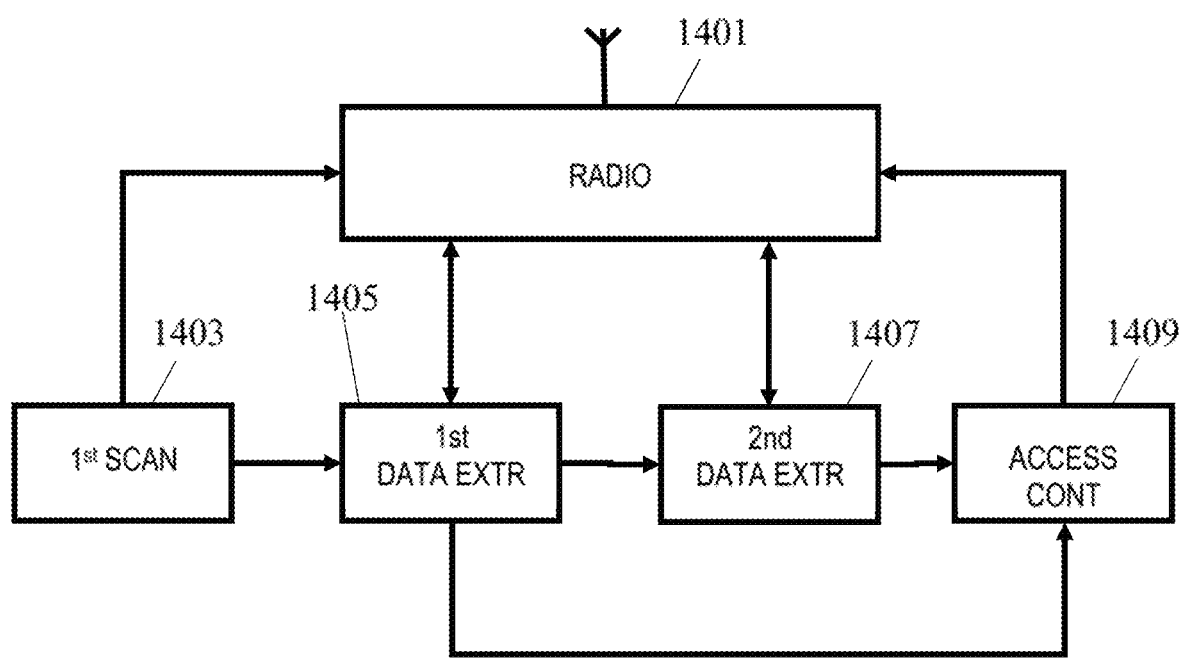
FIG. 14 illustrates an example of an wireless modem for a wireless communication system in accordance with some embodiments of the invention.

FIG. 14 illustrates an example of a wireless modem of a vehicle that may operate in such a system. The wireless modem may specifically be one of the wireless modems described previously and the following description will be based on an exemplary implementation of wireless modem 111 but may apply equally to any of the other wireless modems 113, 701, 703.

The wireless modem 111 comprises a radio circuit 1401 which is arranged to transmit and receive radio signals over the air interface.

The radio circuit 1401 is coupled to a first search circuit 1403 which is arranged to search for a beacon transmission in a frequency channel. The first search circuit 1403 may only be able to search a single frequency channel at a time and further, when performing a search for a beacon signal, the wireless modem 111 may not be able to communicate over the air interface, e.g. because the search utilizes the radio circuit 1401 such that this is not available for other functions and operations.

The first search circuit 1403 is thus arranged to scan for a beacon signal in a frequency channel. In order to allow a fast search/scan/detection of the beacon signal, the first search circuit 1403 can be configured to perform the search in a specific frequency channel. The frequency channel may for example be selected by a suitable algorithm implemented in the first search circuit 1403, may be provided as a specific user input, or may e.g. even be fixed during manufacturing.

In the example, the first search circuit 1403 may be configured to search for the beacon signal in the first frequency channel. As previously described, the system may be set up so that access points use one frequency channel for upstream access points and one frequency channel for downstream access points. The first search circuit 1403 may accordingly be setup for scanning the frequency channel that is used by access points that support the wireless modem 111, i.e. typically access points that form beams in the opposite direction of the beam formed by the wireless modem 111.

For example, a forward facing wireless modem, such as the wireless modem 111, will when the vehicle is travelling in the upstream direction, connect to access points that form beams in the downstream direction, i.e. to downstream access points. Thus, in this case, the first search circuit 1403 will be configured with the frequency channel of the downstream access points, i.e. frequency channel 5 in the specific example. If instead, the wireless modem was a rearwards facing wireless modem, such as wireless modem 113, a search circuit would instead be configured with the frequency channel of the upstream access points as such a modem forms connections with the upstream access points, i.e. frequency channel 6 in the specific example.

If the vehicle were to travel in the downstream direction, the wireless modems would connect to the opposite access points and accordingly the search circuits would be configured for the opposite frequency channels.

The first search circuit 1403 is accordingly arranged to scan for beacon signals. The scan may be initiated when the wireless modem is seeking to attach to a new access point. For example, if a link formed by the wireless modem 113 to an access point is terminated, e.g. due to a decreasing throughput resulting from deteriorating propagation conditions as the vehicle moves away from the access point, the wireless modem 113 will seek to setup a new link/association to another access point. This process will initiate by the wireless modem 113 seeking to detect a candidate access point by scanning for a beacon signal. In the present example, this is done by the first search circuit 1403 searching for a beacon signal within the first frequency channel.

The first search circuit 1403 may for example be arranged to perform repeated attempts to receive and demodulate beacon frames. The first search circuit 1403 may specifically be arranged to perform a search/scan for a beacon signal by setting the antenna pattern to an omni-directional pattern and then seek to receive beacon frames. When a frame is successfully decoded the BSSID for the access point transmitting the beacon frame is known and the receive power may noted. The first search circuit 1403 may after detection of one beacon frame then continue to try to receive a beacon frame on designated channel for a fixed duration. If this results in more than one beacon frame/signal being received, the strongest decoded beacon signal may be selected (thus the scan/search process may determine the strongest BSSID that is detected on the frequency channel being scanned.

The wireless modem 113 further comprises a first data receiver 1405 which is coupled to the radio circuit 1401 and the first search circuit 1403. The first data receiver 1405 is arranged to extract beacon data from a detected beacon signal. Thus, when the first search circuit 1403 detects a beacon signal, it may indicate this to the first data receiver 1405 which proceeds to extract the data comprised in the beacon signal. In some embodiments, the first search circuit 1403 may be arranged to decode the entire beacon signal and my provide a the decoded data to the first data receiver which may simply extract the relevant beacon data from the provided data signal. In other embodiments, the first data receiver 1405 may specifically demodulate and decode etc. a provided radio signal to extract the beacon data included in the beacon signal.

The first data receiver 1405 may specifically extract an indication of the wireless access point transmitting the beacon signal, and if such data is included may further extract a load value indicative of a loading of the wireless access point transmitting the beacon signal and an indication of another wireless access point with overlapping coverage with the wireless access point transmitting the beacon signal.

Thus, if the vehicle is close to the first downstream access point 203, e.g. if it is at the station area 1103, the first search circuit 1403 may detect the beacon signal transmitted by the first downstream access point 203. The first data receiver 1405 may then proceed to extract the data from this beacon signal and specifically may extract the transmitted/broadcast identification of the first downstream access point 203, the load value for the first downstream access point 203, and the indication of the second downstream access point 1107.

In response to the detection of the indication of the second downstream access point 1107, the wireless modem 113 may determine that there is the potential of accessing a second access point which has overlapping coverage with the first downstream access point 203. It may accordingly proceed to determine whether such a second access point should be accessed instead of the first downstream access point 203 transmitting the detected beacon signal.

Specifically, the wireless modem 113 may comprise a second data receiver 1407 which is coupled to the first data receiver 1405 and the radio circuit 1401 and which is arranged to extract data from a second beacon signal transmitted by the second downstream access point 1107. The second data receiver 1407 operates in a second frequency channel which is different from the first frequency channel used by the first downstream access point 203.

In some embodiments, the second data receiver 1407 may be arranged to perform a full scan/search for a beacon signal in the second frequency channel. Specifically, the second data receiver 1407 may perform the same operation as described previously with respect to the first search circuit 1403 and the first data receiver 1405, e.g. it may set the antenna beam shape to omnidirectional and seek to receive and decode one or more beacon signals in the second frequency channel. If successful, it may proceed to extract the beacon data from the strongest received beacon signal in the second frequency channel.

It will be appreciated that in many embodiments, the first search circuit 1403, the first data receiver 1405, and the second data receiver 1407 may be implemented by the same functionality which is controlled to perform the described functionality at different times.

For example, the wireless modem 113 may comprise a single antenna, a single beamform circuit, a single radio circuit, and a single data receiver circuit. This functionality may then be controlled to perform the described functionalities. For example, the search for the beacon signal in the first frequency channel is achieved by configuring the radio circuit and beamform to provide an omnidirectional receiving function for the first frequency channel. The data receiver circuit is then configured to receive data and the first search circuit 1403 and first data receiver 1405 may be completed by control functionality that identifies the receipt of a beacon frame and which selects the strongest received frame and extracts the data. The second data receiver 1407 may be implemented by the same functionality performing the same operation but with the radio circuit being configured to receive data in the second frequency channel. The resulting detected data is then the detected beacon data for the second downstream access point 1107.

In some embodiments, the second frequency channel is predetermined and may be known to the wireless modem 113. For example, in some embodiments, all the secondary access points aimed in the same direction (i.e. all upstream secondary access points or all downstream access points) will be allocated the same frequency. For example, all downstream secondary access points may use frequency channel 3 and all upstream secondary access points may use frequency channel 4.

In such embodiments, the second frequency channel that will be used by the second downstream access point 1107 will accordingly be known by the wireless modem 113 and the second data receiver 1407 can be pre-configured to extract data from a beacon signal in a specific frequency channel.

In other embodiments, a more dynamic allocation and use of frequency channels may be used and for example there may be no predetermined relationship between the frequency channel in which the first beacon signal is detected and the frequency channel used by the secondary access point. In such embodiments, the first beacon signal transmitted by the first downstream access point 203 may for example include an indication of frequency channel used by the second downstream access point 1107 and the second data receiver 1407 may be dynamically reconfigured based on this indication to receive the beacon signal in the appropriate frequency channel.

In some embodiments, the transmission of the second beacon signal may be closely linked to the transmission of the first beacon signal such that the second data receiver 1407 can directly receive the data from the second beacon signal. For example, in some embodiments, the timing of the beacon signals (and time slots) may be synchronized and e.g. the beacon signals may be transmitted at exactly the same time. In such scenarios, the second data receiver 1407 may directly proceed to receive the signal transmitted in the second frequency channel at the same time as the first beacon signal is transmitted in the first frequency channel.

However, in many embodiments, such a relationship is not reliable or utilized and the second data receiver 1407 may be arranged to first search for a beacon signal in the second frequency channel. This search may follow the same approach as used by the first search circuit 1403 when searching for the first beacon signal in the first frequency channel, e.g. it may search for a predetermined data pattern. Indeed, in many embodiments, the second data receiver 1407 may reuse the same functionality of the first search circuit 1403 to search for the second beacon signal (in the second frequency channel).

The second data receiver 1407 is thus arranged to determine the second beacon signal in response to the indication of the second wireless access point in the first beacon signal. The determination may simply be that a second beacon signal may exist since the first beacon signal indicates that a second access point exists, or may e.g. be determining properties of the second beacon signal based on data included in the first beacon signal, such as e.g. determining the second frequency channel, a timing of the second beacon signal, a predetermined pattern for the second beacon signal, etc.

The second data receiver 1407 may be arranged to extract data from the second beacon signal and may specifically extract a second load value which is indicative of a loading of the second wireless access point. The first and second load values may in many embodiments relate to the same parameter, e.g. they may both indicate a number of active links for the respective access point, the percentage of loading of the respective access point etc.

The first data receiver 1405 and the second data receiver 1407 are coupled to an access controller 1409 which is fed the first and second load values. The access controller 1409 is arranged to select a possible target access point and to initiate a mm wave link setup with the target wireless access point.

The access controller 1409 is in the example arranged to select between (at least) the first downstream access point 203 and the second downstream access point 1107 based on the first and second load values. Thus, the access controller 1409 may select between the two downstream access points 203, 1107 based on the indications of the loading of the downstream access points 203, 1107 provided by the access points themselves. As a low complexity example, the access controller 1409 may select the access point for which the loading value is indicative of the lowest load value.

The access controller 1409 may proceed to initialise a link setup with the selected target access point using any suitable approach, such as transmitting a suitable link setup request message in an appropriate time slot of the frequency channel of the selected target access point. For example, for an IEEE 802.11ad system, standard IEEE 802.11ad link setup techniques may be used (association beamforming and then association).

The system may then proceed to setup a new mm wave link which is then used for communication between the vehicle and the fixed network. If the link setup is not successful, the access controller 1409 may e.g. proceed to seek to setup a new link to the access point that was not selected first, e.g. it may proceed to seek to setup a new link with the first downstream access point 203 if a link setup process fails with the second downstream access point 1107 being selected as the target access point.

Such an approach may provide a highly efficient and advantageous approach in many embodiments and scenarios. It may provide a practical and often low complexity implementation with typically reduced requirements for additional circuitry.

The approach may typically provide efficient increased capacity especially for high demand (hot spot) areas while still allowing low complexity approaches. In particular, the approach tends to allow fast and flexible selection and identification of suitable access points, and may do so without requiring complex circuitry for multiple parallel beacon searches and scans. In particular, it may still allow preconfigured beacon searches in a single frequency channel, and may support e.g. system deployments where a continuous and contiguous coverage is provided by access points all sharing a frequency channel.

The approach may provide efficient load balancing between access points and may further provide such efficient load balancing to be achieved based on wireless modem operations and decisions. The approach does not require complex, or even coordinated, load balancing operations or algorithms to be performed by the access points or the fixed network.

Further, the approach does not require communication between access points but may be implemented by separate access points that operate independently and without knowledge of conditions at the other access point(s). This may reduce signalling overhead and may facilitate implementation and in particular introduction to existing systems.

The wireless modem and the described functional blocks may be implemented using conventional analog and/or digital circuits, including analog radio circuits, A/D and D/A controllers for converting between digital and analog domains, microcontroller or microprocessor circuits for executing a firmware or software code for implementing the described operations and functions as will be known to the skilled person.

Different types of load values may be used in different embodiments. In some embodiments, load values may be provided which are indicative of one or more of a number of wireless modems being associated with the corresponding access point, the number of wireless modems the access point currently has established links with, the number of vehicles which has links with the access point, a percentage of the available capacity that is currently used by the access point, etc.

Also, the selection criterion used by the access controller 1409 to select the target access point, and specifically to select between the first access point and the second access point, may depend on the preferences and requirements of the individual embodiment, and any suitable criterion or selection algorithm may be used.

In many embodiments, the access controller 1409 may be arranged to compare the first load value and the second load value and select the target access point dependent on the comparison. For example, it may select the access point for which the load value is indicative of the lowest load value. As another example, a bias towards the primary or secondary access point may be introduced e.g. by requiring the load value for one access point to be less than the load value for the other access point by a given amount before being selected as the target access point.

Thus, in some embodiments, the criterion for selecting the second downstream access point 1107 may include a requirement that the loading of the first downstream access point 203 exceeds the loading of the second downstream access point 1107 point by more than a threshold. The threshold may specifically be zero corresponding to a selection of the access point with the lowest loading, or may alternatively be a positive or negative value depending on whether a bias towards the first downstream access point 203 or second downstream access point 1107 is desired.

As mentioned, in many embodiments, the load value for an access point may be indicative of the number of wireless modems that have mm wave links established with the wireless access point. Equivalently, it may be indicative of the number of wireless modems that are associated with the access point. In many embodiments, the same approach is used for both the first and second downstream access point 203, 1107 and thus a first load value may indicate the number of wireless modems linked to the first downstream access point 203, henceforth for brevity referred to as the first number, and a second load value may indicate the number of wireless modems linked to the second downstream access point 1107, henceforth for brevity referred to as the second number.

In such embodiments, the access controller 1409 may be arranged to select the first wireless access point as the target wireless access point if a difference between the second number and the first number exceeds a threshold and to select the second wireless access point as the target wireless access point if the difference between the second number and the first number is below the threshold. The difference may be determined as the second number minus the first number. Thus, if the number of wireless modems currently supported by the second downstream access point 1107 exceeds the number of wireless modems supported by the first downstream access point 203 by more than a threshold, the first downstream access point 203 is selected. Further, if the number of wireless modems currently supported by the second downstream access point 1107 is below the number of wireless modems supported by the first downstream access point 203 by more than the threshold, the second downstream access point 1107 is selected.

The threshold can be varied to provide the desired bias. For example, if the desire is to distribute load equally between the first downstream access point 203 and the second downstream access point 1107, a threshold of zero may be used. In this case, the wireless modem 113 will seek to establish a new link with the access point that is currently supporting the lowest number of wireless modems. If the desire is to bias the links towards the second downstream access point 1107, a threshold larger than zero can be used, and if the desire is to bias the links towards the first downstream access point 203, a threshold below zero can be used.

If the difference between the first number and the second number is equal to the threshold, the access controller 1409 may be arranged to select the first downstream access point 203. More generally, if an absolute difference between the first load value and the second load value is less than a threshold, i.e. if the difference between the load values is sufficiently low, the access controller 1409 may be arranged to select the first downstream access point 203. Such an approach will result in a load balancing between the access points but with close decisions being biased towards the primary access point. This may be a highly advantageous approach in many embodiments, and may e.g. reduce handovers etc.

The use of load values in the form of the number of wireless modems being supported by the access points may provide a highly advantageous operation in many embodiments. It may provide an efficient and desired load balancing while allowing this to be achieved using low complexity operations. The load values are typically easy to determine by the individual access point and easy to compare by the wireless modems.

It will be appreciated that in many embodiments, other or further parameters may be considered in the selection of the target access point. For example, the selection algorithm may consider radio propagation conditions for the first downstream access point 203 and the second downstream access point 1107, and may then be arranged to bias access selection towards the access point experiencing the best propagation conditions. The bias may for example be introduced by adapting the threshold in dependence on the radio conditions.

In such embodiments, the access points may for example estimate general propagation conditions based on links established to wireless modems. For example, the link quality for links that are active for longer than a given predetermined duration (thereby indicating that this reflects links with trains that are stopped at the station) may be averaged and used as an indication of overall propagation conditions for the frequency channel used by the access point. The access points may then be arranged to include indications of the estimated propagation conditions in the beacon data, and the wireless modems may extract this data and use it to adapt the selection threshold.

In some embodiments, the first load value and/or second load value may be indicative of a number of vehicles having mm wave links established with the first downstream access point 203 respectively second downstream access point 1107. Indeed, the approaches and selection criteria described above with respect to a first number representing the number of links of the first downstream access point 203 and a second number representing the number of links of the second downstream access point 1107 may directly be applied to a first number representing the number of vehicles supported by the first downstream access point 203 and a second number representing the number of vehicles supported by the second downstream access point 1107.

In such embodiments, the wireless modems may for example be arranged to report a vehicle identity when setting up a new link and the access points may keep track of how many vehicles are currently supported. This number may then be included in the beacon data as the load value for the access point.

It will be appreciated that whereas the load values for different access points may in many embodiments represent the same underlying load parameter, such as the number of links or vehicles supported, this is not necessarily the case in all embodiments. For example, in some embodiments, different parameter values may be provided and the access controller 1409 may be arranged to convert between different types of load values. For example, if the first downstream access point 203 provides a load value of how many wireless modems are supported and the second downstream access point 1107 provides a load value of how many vehicles are supported, the access controller 1409 may convert between these using an estimated number of wireless modems per vehicle. For example, for the train scenario described previously, it may be assumed that the access points support two wireless modems per vehicle.

In some embodiments, the transmission of the indication of the paired access point, i.e. of the transmission of the indication of the second downstream access point 1107 by the first downstream access point 203, may be conditional on an operating parameter meeting a criterion.

Specifically, the first downstream access point 203 may be arranged to transmit the indication of the second downstream access point 1107 conditional on a loading of the first wireless access point meeting a criterion. The loading may be the same as the loading indicated by the load value or may be a different load measure.

As an example, in some embodiments, the first downstream access point 203 may be arranged to only transmit an indication of the second downstream access point 1107 if the loading of the first downstream access point 203 (in accordance with any suitable measure such as number of links supported, number of vehicles supported, percentage of capacity used etc.) is above a threshold.

Thus, for a loading of the first downstream access point 203 which is below the threshold, the first downstream access point 203 will not transmit an indication of the second downstream access point 1107 and the wireless modem 113 will not be informed of the presence of the second downstream access point 1107. Accordingly, it will not proceed to seek to access the second downstream access point 1107 but will set up a link with the first downstream access point 203. However, if the loading increases above the threshold, the first downstream access point 203 will begin to include the reference to the second downstream access point 1107 in the beacon signal and as a result wireless modems begin to evaluate both the first downstream access point 203 and the second downstream access point 1107 as potential target access point. Thus, in such an embodiment, for low loadings the system may operate in a simple configuration with faster access point detection and access. For higher loadings, the system may adapt and provide the second downstream access point 1107 as a possible additional resource thereby increasing overall capacity.

In many embodiments, each access point may be arranged to transmit/broadcast a load value for the access point itself but not for the overlapping access point. For example, the first downstream access point 203 may be arranged to provide a load value for itself but may not include any load data or load indication for the second downstream access point 1107 in the transmitted beacon signal. Similarly (alternatively or additionally), the second downstream access point 1107 may be arranged to provide a load value for itself but may not include any load data or load indication for the first downstream access point 203 in the transmitted beacon signal.

As described, the access point selection for a new link is made by the wireless modem 113 itself based on received load values from both the access points and accordingly the wireless modem 113 may receive load information for both access points and compare these when selecting a suitable access point.

An important advantage of such an approach is that each access point may generate the relevant data and the beacon signal without requiring any load data being provided by the paired access point. For example, the first downstream access point 203 may generate and transmit a beacon signal based only on data of the operation conditions for the first downstream access point 203 and without having or requiring any knowledge about operating conditions for the second downstream access point 1107. Similarly, the second downstream access point 1107 may generate and transmit a beacon signal based only on data of the operating conditions for the second downstream access point 1107 and without having or requiring any knowledge about operating conditions for the first downstream access point 203.

Accordingly, no additional signaling or interworking between the paired access points is required and no knowledge is needed about operating conditions of the other access point. This may not only reduce complexity and reduce signaling overhead, but may also facilitate dynamic introduction of additional access points into an existing and deployed (and potentially operating) system. For example, adding the second downstream access point 1107 to the system of FIG. 11 may only require a simple manual change to the first downstream access point 203 such that this includes an indication in the beacon signal that the second downstream access point 1107 is present.

However, in other embodiments, the paired access points may be arranged to communicate with each other, and they may for example be arranged to exchange data on operating conditions (unilaterally or bilaterally). Such communication may typically be via the fixed network or may be a direct connection as the access points may often be colocated. In some embodiments, the first downstream access point 203 may for example receive indications of the loading of the second downstream access point 1107 and may adapt the operation accordingly. For example, in some embodiments, the first downstream access point 203 may transmit an indication of a current loading of the second downstream access point 1107 to the wireless modem 113 which may e.g. use it to conditionally determine whether to search for the second downstream access point 1107 or not.

In many embodiments, the indication of the second downstream access point 1107 may be conditional on the loading of the second downstream access point 1107. Thus, whether the first downstream access point 203 transmits a beacon signal that includes the indication of (the presence of) the second downstream access point 1107 may be dependent on the loading of the second downstream access point 1107 as reported to the first downstream access point 203 by the second downstream access point 1107.

As a low complexity example, the first downstream access point 203 may be arranged to transmit an indication of the second downstream access point 1107 only if the loading of the second downstream access point 1107 meets a criterion, such as specifically that it is below a threshold.

In many embodiments, the transmission of the indication of the second downstream access point 1107 in the beacon signal is dependent on the loading of both the first downstream access point 203 and the second downstream access point 1107. Specifically, the inclusion of the indication of the second downstream access point 1107 may only be done if the loadings of both the first downstream access point 203 and second downstream access point 1107 meet a criterion.

The exact criterion will depend on the preferences and requirements of the individual embodiment. However, in many embodiments, the criterion may be a relative requirement such that a relationship between the loadings must meet a given condition.

As a specific example, in many embodiments the criterion for the indication of the second downstream access point 1107 to be transmitted may include a requirement that the loading of the first downstream access point 203 exceeds the loading of the second downstream access point 1107 by more than a threshold. The threshold may be used to bias the loading towards the first downstream access point 203 or the second downstream access point 1107.

In many embodiments, the threshold may be zero and for example the indication of the second downstream access point 1107 may only be included if the loading of the second downstream access point 1107 is lower than that of the first downstream access point 203.

The approach may allow an improved dynamic adaptation of the operation such that the additional delay and resource demand in evaluating the second downstream access point 1107 is only performed when this is likely to provide an improved (e.g. more even) load balancing between the first downstream access point 203 and the second downstream access point 1107.

It will be appreciated that the above description has focused on downstream access points but that the described approaches apply equally to upstream access points, or indeed to any overlapping access points. It will further be appreciated that the references to a first downstream access point 203 and a second downstream access point 1107 could be replaced simply by references to a first access point (203) and a second access point (1107).

In the examples described above, the paired access points are substantially colocated, and typically are mounted on the same mast. However, it will be appreciated that in other embodiments, the paired access points may not be colocated. For example, the second downstream access point 1107 may be positioned in close proximity to the station area.

In many embodiments, the paired access points may advantageously be within 100 m, 50 m, 20 m, or 10 m of each other. This may typically provide a close correlation between the access points and allow an improved interworking between the access points in supporting the wireless modems.

In the system, the paired access points have an overlapping coverage area. In many embodiments, the coverage area for the two access points may be substantially the same. In other embodiments, the coverage area may be overlapping but not the same. In such cases, the overlapping coverage area may typically be at least 20%, 25%, or 50% of the coverage area of the primary access point (i.e. the first downstream access point 203 in the specific example).

In many embodiments, the overlapping coverage area includes an area which is close to the primary access point. For example, the overlapping coverage area may include an internal area of the coverage area of the primary access point which is no further from the primary access point than 30%, 50%, or 70% of the extent of the coverage area from the primary access point.

In many embodiments, the overlapping coverage area includes an area which is close to the secondary access point. For example, the overlapping coverage area may include an internal area of the coverage area of the secondary access point which is no further from the secondary access point than 30%, 50%, 70% or 100% of the extent of the coverage area from the secondary access point.

It will be appreciated that the above description for clarity has described embodiments of the invention with reference to different functional circuits, units and processors. However, it will be apparent that any suitable distribution of functionality between different functional circuits, units or processors may be used without detracting from the invention. For example, functionality illustrated to be performed by separate processors or controllers may be performed by the same processor or controllers. Hence, references to specific functional units or circuits are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed, the functionality may be implemented in a single unit, in a plurality of units or as part of other functional units. As such, the invention may be implemented in a single unit or may be physically and functionally distributed between different units, circuits and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements, circuits or method steps may be implemented by e.g. a single circuit, unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category but rather indicates that the feature is equally applicable to other claim categories as appropriate. A claim indicated to be dependent on one claim may also be dependent on all other claims. Specifically, a claim being defined as being dependent on claim 1 may be dependent on all previous claims, and specifically a reference to "claim 1" may be replaced by a reference to "any previous claim". Furthermore, the order of features in the claims does not imply any specific order in which the features must be worked and in particular the order of individual steps in a method claim does not imply that the steps must be performed in this order. Rather, the steps may be performed in any suitable order. In addition, singular references do not exclude a plurality. Thus, references to "a", "an", "first", "second" etc. do not preclude a plurality. Reference signs in the claims are provided merely as a clarifying example and shall not be construed as limiting the scope of the claims in any way.

We claim:

1. A communication system for supporting communication between an end node of a vehicle and a remote correspondent node via a fixed network, the communication system comprising:
a plurality of wireless access points of the fixed network, each wireless access point having a directional antenna arrangement for mm wave radio communication using directional beams, each of the plurality of wireless access points being arranged to transmit a beacon signal in a mm wave frequency channel allocated to the wireless access point;
at least a first wireless modem arranged to establish mm wave radio communication links to wireless access points of the plurality of wireless access points, the mm wave radio communication links supporting a data session between the end node and the remote correspondent node, the first wireless modem being located on the vehicle and employing electronically steerable beamforming directional antennas for establishing the mm wave radio communication links,
wherein the first wireless modem comprises:
a first search circuit arranged to search for a beacon transmission in a first frequency channel;
a first data receiver arranged to extract data from a detected beacon signal, the first data receiver being arranged to extract from the detected beacon signal:
an indication of a first wireless access point of the plurality of wireless access points transmitting the beacon signal;
a first load value indicative of a loading of the first wireless access point;
an indication of a second wireless access point having overlapping coverage with the first wireless access point;
a second data receiver arranged to extract data from a second beacon signal transmitted by the second wireless access point in a second frequency channel being different from the first frequency channel; the second data receiver being arranged to determine the second beacon signal in response to the indication of the second wireless access point and to extract from the second beacon signal a second load value indicative of a loading of the second wireless access point;
a selection circuit arranged to select a target wireless access point from a set of wireless access points of the plurality of wireless access points dependent on the first load value and the second load value, the set of wireless access points comprising the first wireless access point and the second wireless access point; and
a circuit arranged to initialize a mm wave link setup with the target wireless access point;
wherein the first load value is indicative of at least one number selected from the group of:
a first number of wireless modems having mm wave links established with the first wireless access point; and
a second number of vehicles having mm wave links established with the first wireless access point.

2. The communication system of claim 1, wherein the second load value is indicative of a second number of wireless modems having mm wave links established with the second wireless access point.

3. The communication system of claim 2, wherein the selection circuit is arranged to select the first wireless access point as the target wireless access point if a difference between the second number and the first number exceeds a threshold and to select the second wireless access point as the target wireless access point if the difference between the second number and the first number is below the threshold.

4. The communication system of claim 1, wherein the selection circuit is arranged to select the first wireless access point as the target wireless access point if an absolute difference between the first load value and the second load value is below a threshold.

5. The communication system of claim 1, wherein the first wireless access point is arranged to include no load data for the second wireless access point in a beacon signal transmitted by the first wireless access point.

6. The communication system of claim 1, wherein the second wireless access point is arranged to include no load data for the first wireless access point in a beacon signal transmitted by the second wireless access point.

7. The communication system of claim 1, wherein the second wireless access point is arranged to transmit load data to the first wireless access point and the first wireless access point is arranged to transmit the indication of the second wireless access point conditional on a loading of the second wireless access point indicated by the load data meeting a criterion.

8. The communication system of claim 7, wherein the criterion is dependent on a loading of the first wireless access point.

9. The communication system of claim 8, wherein the criterion includes a requirement that the loading of the first wireless access point exceeds the loading of the second wireless access point by more than a threshold.

10. The communication system of claim 1, wherein the first wireless access point and the second wireless access point are co-located.

11. The communication system of claim 1, wherein a distance between the first wireless access point and the second wireless access point is no more than 100 m.

12. The communication system of claim 1, wherein the first wireless access point is arranged to transmit the indication of the second wireless access point conditional on a loading of the first wireless access point meeting a criterion.

13. The communication system of claim 1, wherein the second data receiver is arranged to determine the second frequency channel in response to an indication of the second frequency channel extracted from the first beacon signal.

14. A wireless modem for a communication system supporting communication between an end node of a vehicle and a remote correspondent node via a fixed network, the communication system comprising:
a plurality of wireless access points of the fixed network, each wireless access point having a directional antenna arrangement for mm wave radio communication using directional beams, each of the plurality of wireless access points being arranged to transmit a beacon signal in a mm wave frequency channel allocated to the wireless access point;
wherein the wireless modem is arranged to establish mm wave radio communication links to wireless access points of the plurality of wireless access points, the mm wave radio communication links supporting a data session between the end node and the remote correspondent node, the wireless modem being located on the vehicle and employing electronically steerable beamforming directional antennas for establishing the mm wave radio communication links, the wireless modem further comprising:
a first search circuit arranged to search for a beacon transmission in a first frequency channel;
a first data receiver arranged to extract data from a detected beacon signal, the first data receiver being arranged to extract from the detected beacon signal:
an indication of a first wireless access point of the plurality of wireless access points transmitting the beacon signal;
a first load value indicative of a loading of the first wireless access point;
an indication of a second wireless access point having overlapping coverage with the first wireless access point;
a second data receiver arranged to extract data from a second beacon signal transmitted by the second wireless access point in a second frequency channel being different from the first frequency channel; the second data receiver being arranged to determine the second beacon signal in response to the indication of the second wireless access point and to extract from the second beacon signal a second load value indicative of a loading of the second wireless access point;
a selection circuit arranged to select a target wireless access point from a set of wireless access points of the plurality of wireless access points dependent on the first load value and the second load value, the set of wireless access points comprising the first wireless access point and the second wireless access point; and
a circuit arranged to initialize a mm wave link setup with the target wireless access point;
wherein the first load value is indicative of at least one number selected from the group of:
a first number of wireless modems having mm wave links established with the first wireless access point; and
a second number of vehicles having mm wave links established with the first wireless access point.

15. A method of operation for a communication system supporting communication between an end node of a vehicle and a remote correspondent node via a fixed network, the communication system comprising:
a plurality of wireless access points of the fixed network, each wireless access point having a directional antenna arrangement for mm wave radio communication using directional beams, each of the plurality of wireless access points being arranged to transmit a beacon signal in a mm wave frequency channel allocated to the wireless access point;
at least a first wireless modem arranged to establish mm wave radio communication links to wireless access points of the plurality of wireless access points, the mm wave radio communication links supporting a data session between the end node and the remote correspondent node, the first wireless modem being located on the vehicle and employing electronically steerable beamforming directional antennas for establishing the mm wave radio communication links, and
wherein the method comprises the first wireless modem:
searching for a beacon transmission in a first frequency channel;
extracting data from a detected beacon signal, the first data receiver being arranged to extract from the detected beacon signal:
an indication of a first wireless access point of the plurality of wireless access points transmitting the beacon signal;
a first load value indicative of a loading of the first wireless access point;
an indication of a second wireless access point having overlapping coverage with the first wireless access point;
extracting data from a second beacon signal transmitted by the second wireless access point in a second frequency channel being different from the first frequency channel, the extracting data including determining the second beacon signal in response to the indication of the second wireless access point and extracting from the second beacon signal a second load value indicative of a loading of the second wireless access point;
selecting a target wireless access point from a set of wireless access points of the plurality of wireless access points dependent on the first load value and the second load value, the set of wireless access points comprising the first wireless access point and the second wireless access point; and
initializing a mm wave link setup with the target wireless access point;
wherein the first load value is indicative of at least one number selected from the group of:
a first number of wireless modems having mm wave links established with the first wireless access point; and
a second number of vehicles having mm wave links established with the first wireless access point.

16. A method of operation for a wireless modem of a communication system supporting communication between an end node of a vehicle and a remote correspondent node via a fixed network, the communication system comprising:
a plurality of wireless access points of the fixed network, each wireless access point having a directional antenna arrangement for mm wave radio communication using directional beams, each of the plurality of wireless access points being arranged to transmit a beacon signal in a mm wave frequency channel allocated to the wireless access point;
wherein the wireless modem is arranged to establish mm wave radio communication links to wireless access points of the plurality of wireless access points, the mm wave radio communication links supporting a data session between the end node and the remote correspondent node, the wireless modem being located on the vehicle and employing electronically steerable beamforming directional antennas for establishing the mm wave radio communication links,
the method comprising:
searching for a beacon transmission in a first frequency channel;
extracting data from a detected beacon signal, the first data receiver being arranged to extract from the detected beacon signal:
an indication of a first wireless access point of the plurality of wireless access points transmitting the beacon signal;
a first load value indicative of a loading of the first wireless access point;
an indication of a second wireless access point having overlapping coverage with the first wireless access point;
extracting data from a second beacon signal transmitted by the second wireless access point in a second frequency channel being different from the first frequency channel, the extracting data including determining the second beacon signal in response to the indication of the second wireless access point and extracting from the second beacon signal a second load value indicative of a loading of the second wireless access point;

selecting a target wireless access point from a set of wireless access points of the plurality of wireless access points dependent on the first load value and the second load value, the set of wireless access points comprising the first wireless access point and the second wireless access point; and initializing a mm wave link setup with the target wireless access point;

wherein the first load value is indicative of at least one number selected from the group of:

a first number of wireless modems having mm wave links established with the first wireless access point; and a second number of vehicles having mm wave links established with the first wireless access point.

* * * * *